(12) United States Patent
Hasegawa et al.

(10) Patent No.: US 6,282,320 B1
(45) Date of Patent: Aug. 28, 2001

(54) VIDEO DATA DECODING APPARATUS AND METHOD AND VIDEO SIGNAL REPRODUCTION APPARATUS AND METHOD

(75) Inventors: Akira Hasegawa, Kanagawa; Yoshinori Shimizu, Tokyo; Masayoshi Mizuno, Tokyo; Takayuki Ishida, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/040,809

(22) Filed: Mar. 18, 1998

(30) Foreign Application Priority Data

Mar. 19, 1997 (JP) .................................................. 9-085628

(51) Int. Cl.[7] .................................................... G06K 9/36
(52) U.S. Cl. ............................................ 382/233; 386/109
(58) Field of Search .................................... 382/233, 236, 382/239; 386/125, 126, 109, 68, 111

(56) References Cited

U.S. PATENT DOCUMENTS

| | | | |
|---|---|---|---|
| 5,535,008 | * 7/1996 | Yamagishi et al. | 358/342 |
| 5,602,956 | * 2/1997 | Suzuki et al. | 386/68 |
| 5,854,873 | * 12/1998 | Mori et al. | 386/92 |
| 5,867,176 | * 2/1999 | Yamagishi | 345/473 |
| 5,870,523 | * 2/1999 | Kikuchi et al. | 386/95 |

\* cited by examiner

*Primary Examiner*—Yon J. Couso
(74) *Attorney, Agent, or Firm*—Frommer Lawrence & Haug LLP; William S. Frommer; Glenn F. Savit

(57) ABSTRACT

A DVD reproduction apparatus includes a video decoder capable of outputting smooth video data during forward or backward high-speed reproduction. The video decoder is intermittently supplied with data in VOBU (Video Object Unit) units. According to control by a controller, the decoder outputs the decoded I pictures or P pictures from a memory having a capacity of three or more pictures. In a case of forward reproduction, the pictures are outputted according to the time axis, and in a case of backward reproduction, the pictures are outputted in the opposite direction of the decoding order. Moreover, the decoder counts a VOBU passing time through a demultiplexer provided at a preceding stage and outputs respective pictures at averaged intervals. That is, because three pictures are outputted for each VOBU, pictures are outputted at an interval of the averaged VOBU passing time multiplied by ⅓.

18 Claims, 19 Drawing Sheets

C_PBIT

C_PBI

| (1) C_CAT | Cell Category |
|---|---|
| (2) C_PBTM | Cell Playback Time |
| (3) C_FVOBU_SA | Start address of the First VOBU in the Cell |
| (4) C_FILVU_EA | End address of the First ILVU in the Cell |
| (5) C_LVOBU_SA | Start address of the Last VOBU in the Cell |
| (6) C_LVOBU_EA | End address of the Last VOBU in the Cell |

FIG.8A
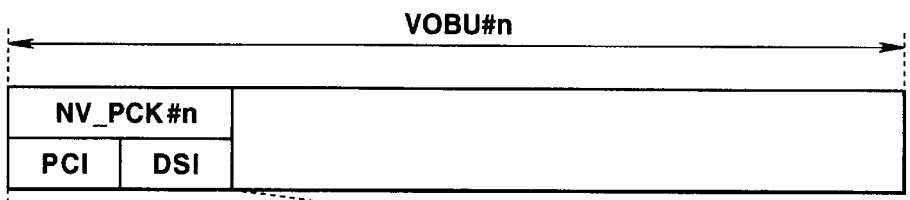
FIG.8B
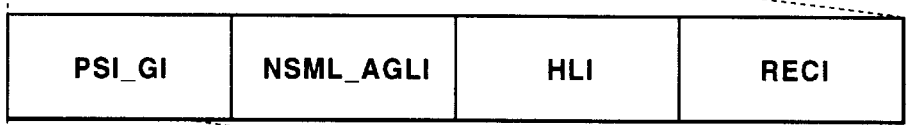
FIG.8C
|  | Content |
|---|---|
| (1) NV_PCK_LBN | LBN of Navigation pack |
| (2) VOBU_CAT | Category of VOBU |
| reserved | reserved |
| (3) VOBU_UOP_CTL | User Operation control of VOBU |
| (4) VOBU_S_PTM | Start PTM of VOBU |
| (5) VOBU_E_PTM | End PTM of VOBU |
| (6) VOBU_SE_E_PTM | End PTM of sequence end in VOBU |
| (7) C_ELTM | Cell Elpse Time |

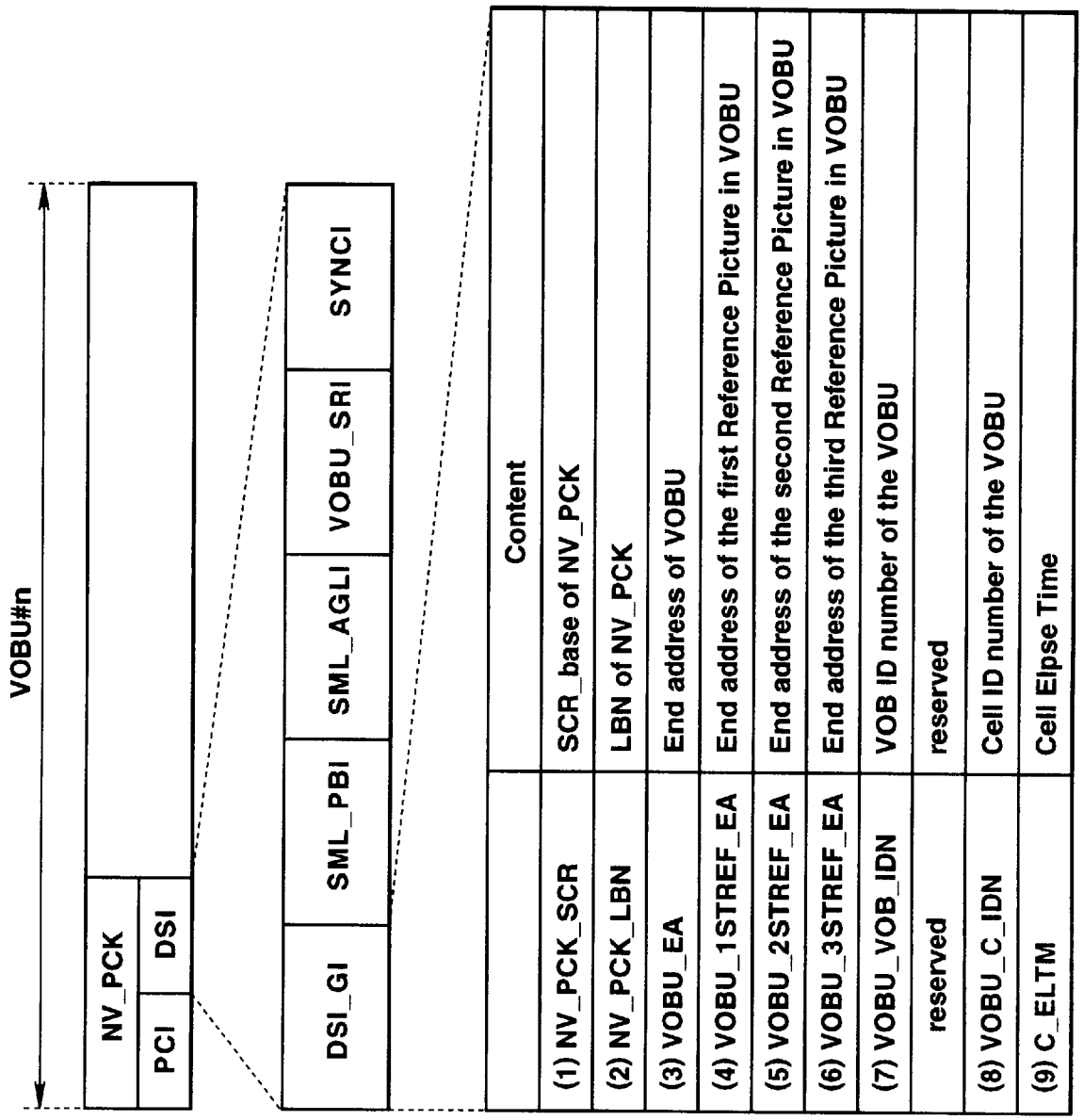

VOBU_SRI

| | Content |
|---|---|
| FWDI Video | Next VOBU start address with a Video data |
| FWDI 240 | +240 VOBU start address and Video exist flag |
| FWDI 120 | +120 VOBU start address and Video exist flag |
| FWDI 60 | + 60 VOBU start address and Video exist flag |
| FWDI 20 | + 20 VOBU start address and Video exist flag |
| FWDI 15 | + 15 VOBU start address and Video exist flag |
| FWDI 14 | + 14 VOBU start address and Video exist flag |
| ⋮ | ⋮ |
| FWDI 3 | + 3 VOBU start address and Video exist flag |
| FWDI 2 | + 2 VOBU start address and Video exist flag |
| FWDI 1 | + 1 VOBU start address and Video exist flag |
| FWDI Next | Next VOBU start address and Video exist flag |
| FWDI Prev | Previous VOBU start address and Video exist flag |
| BWDI 1 | − 1 VOBU start address and Video exist flag |
| BWDI 2 | − 2 VOBU start address and Video exist flag |
| BWDI 3 | − 3 VOBU start address and Video exist flag |
| ⋮ | ⋮ |
| FWDI 14 | − 14 VOBU start address and Video exist flag |
| FWDI 15 | − 15 VOBU start address and Video exist flag |
| FWDI 20 | − 20 VOBU start address and Video exist flag |
| FWDI 60 | − 60 VOBU start address and Video exist flag |
| FWDI 120 | − 120 VOBU start address and Video exist flag |
| FWDI 240 | − 240 VOBU start address and Video exist flag |
| FWDI Video | Previous VOBU start address with a Video data |

FIG.11

Cn : CELL NUMBER
Cnn : NEXT CELL NUMBER TO BE REPRODUCED
SA : VOBS ADDRESS OF VOBU FROM WHICH NEXT DATA IS TO BE FETCHED
n : SCAN INTERVAL
FWDA (FEDI (n)) : FWDA IN FWDI (n)

Cn : CELL NUMBER
Cnn : NEXT CELL NUMBER TO BE RETURNED TO
SA : VOBS ADDRESS OF VOBU FROM WHICH NEXT DATA IS TO BE FETCHED
n : SCAN INTERVAL
FWDA (FED I (n)) : FWDA IN FWD I (n)

NV : NV_PCK PASSING TIME
tn : NV_PCK PASSING INTERVAL
D : PICTURE DISPLAY
  THE FIRST SUBSCRIPT INDICATES THE VOBU PROCESSING ORDER
  THE SECOND SUBSCRIPT INDICATES THE DECODING ORDER

VIDEO DATA DECODING APPARATUS AND METHOD AND VIDEO SIGNAL REPRODUCTION APPARATUS AND METHOD

BACKGROUND OF THE INVENTION

1. Field of the Invention

The present invention relates to a video data decoding apparatus, a video data decoding method, a video signal reproduction apparatus, and video signal reproduction apparatus for intermittently decoding a video data which has been compressed by utilizing a correlation in the time axis direction between a plurality of frames.

2Description of the Prior Art

In the conventional DVD (digital video disc: DVD-VIDEO), for carrying out a special reproduction such as a forward high-speed reproduction and a backward high-speed reproduction, only one I picture (intra coded picture) is used in the MPEG2 (Moving Picture Experts Group 2).

However, when a special reproduction is carried out by using only the I picture, there is a problem that an information amount is insufficient and reproduced picture looks like a high-speed display of slides. Moreover, the information amount is too small even if compared to a high-speed reproduction of a VTR or the like. The display interval is affected by a decoding time and the like and causes a strange feeling.

SUMMARY OF THE INVENTION

It is therefore an object of the present invention to provide a video data decoding apparatus, a video data decoding method, a video signal reproduction apparatus, and a video signal reproduction method capable of outputting a video data of smooth display when carrying out a special reproduction such as a forward and a backward high-speed reproduction.

BRIEF DESCRIPTION OF THE DRAWINGS

FIG. 8 explains the DVD-VIDEO format.

FIG. 9 explains the DVD-VIDEO format.

FIG. 11 explains the DVD-VIDEO format.

DETAILED DESCRIPTION OF PREFERRED EMBODIMENTS

Description will now be directed to a DVD-VIDEO disc reproduction apparatus (hereinafter, referred to as a DVD reproduction apparatus) according to an embodiment of the present invention with reference to the attached drawings.

Figure 1:
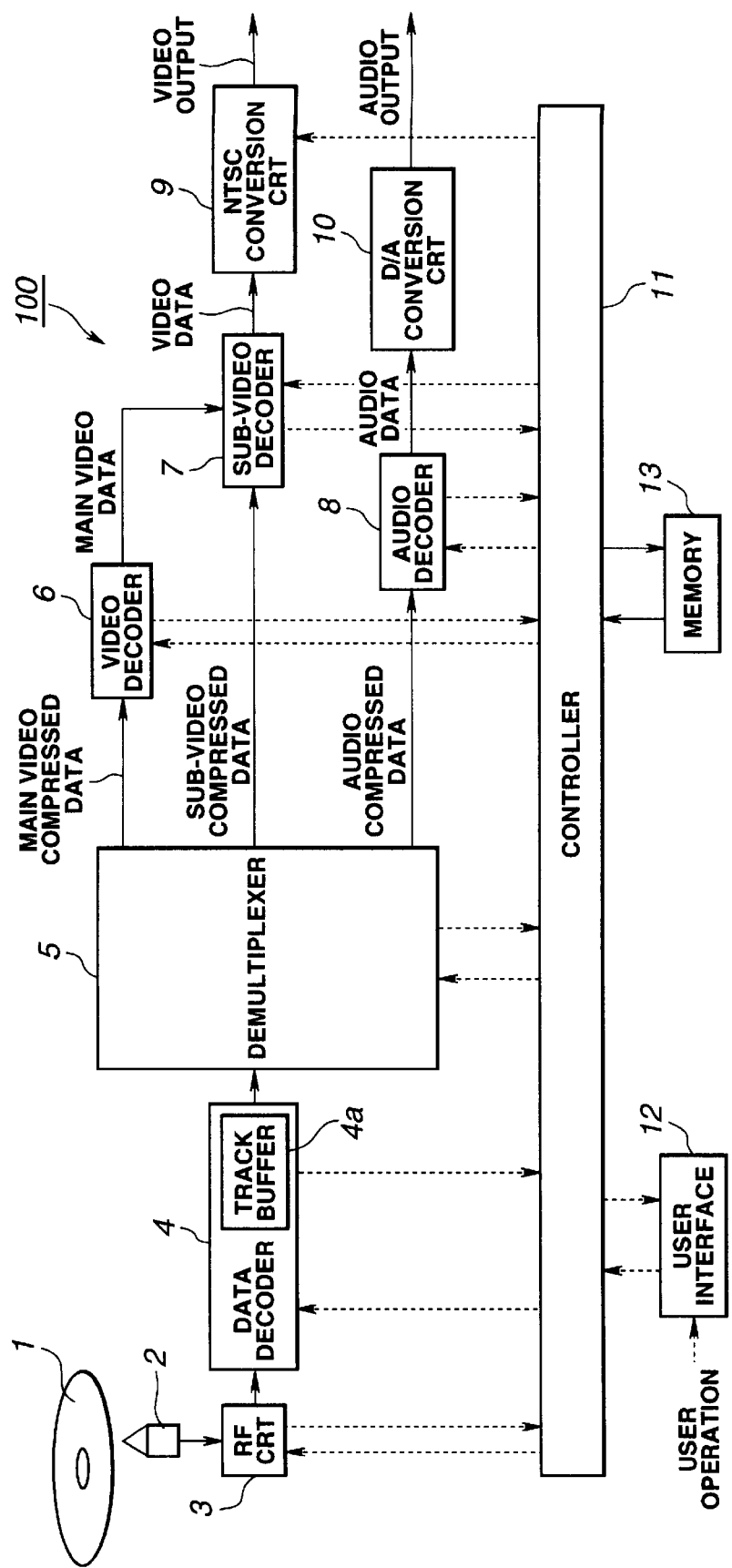
FIG. 1 is a block diagram showing a DVD reproduction apparatus according to the present invention.

FIG. 1 is a block diagram showing the DVD reproduction apparatus.

The DVD reproduction apparatus 100 includes: a pickup 2 for reproducing an RF signal from a recording medium 1; an RF circuit 3 which is supplied with the RF signal reproduced by this pickup 2 and carries out binarization to the RF signal; a data decoder 4 for carrying out a decoding such as an error correction to the reproduced data from the RF circuit 3; and a demultiplexer 5 for isolating from the reproduced data decoded by the data decoder 4, a main video compressed data, a sub-video compressed data, and an audio compressed data.

Moreover, this DVD reproduction apparatus 100 includes: a video decoder 6 for spreading the aforementioned main video compressed data; a sub-video decoder 7 for spreading the aforementioned sub-video compressed data so as to be combined with the main video data; an audio decoder 8 for spreading the aforementioned audio compressed data; a digital/NTSC, PAL conversion circuit (hereinafter, referred to as an NTSC conversion circuit) 9 which is supplied with the video data made from the main video data and the sub-video data from the sub-video decoder 7 and coverts the data into an NTSC signal or a PAL signal; and a digital/analog conversion circuit (hereinafter, referred to as a D/A converter) 10 which is supplied with the audio data from the audio decoder 8 and converts the data into an analog signal.

Moreover, this DVD reproduction apparatus 100 further includes: a controller 11 for controlling the pickup 2, the RF circuit 3, the data decoder 4, the demultiplexer 5, the video decoder 6, the sub-video decoder 7, the audio decoder 8, the NTSC conversion circuit, and the D/A conversion circuit 10; a user interface 12 for interfacing between the controller 11 and a user operation input; and a memory 13 serving as a data storage block of the controller 11.

The DVD reproduction apparatus 100 reproduces, as the recording medium 1, a DVD disc and a DVD-VIDEO disc of reproduction-dedicated type, writable type, rewritable type, and the like.

The pickup 2 reproduces an RF signal from the recording medium 1 and supplies the signal to the RF circuit 3.

The RF circuit 3 caries out a waveform equalization and binarization to this RF signal and creates its synchronization signal and the like as a digital data. The digital data created by this RF circuit 3 is supplied to the data decoder 4.

The data decoder 4, according to the digital data created by the RF circuit 3, carries out data decoding and error correction. The digital data which has been subjected to the decoding and the like by the data decoder 4 is supplied to the demultiplexer 5.

Moreover, this data decoder 4 detects a system header in the MPEG2 format, parameter information contained in the pack header and the like, and a predetermined information contained in the navigation pack (NV_PCK) in the DVD format. The parameter information detected is supplied from the data decoder 4 to the controller 11.

Moreover, this data decoder 4 includes a track buffer 4a at the output stage. This track buffer 4a absorbs the difference in processing speed between the data decoder 4 and the demultiplexer 5.

In the demultiplexer 5, the digital data which has been subjected to the decoding including error correction by the data decoder 4 is divided into a main video compressed data, sub video compressed data, and an audio compressed data.

Here, the main video data is video data which has been compressed by the MPEG2 such as video streams in the DVD format. The sub video data is data such as a superimposed caption to be combined with the main video data, such as sub-picture streams in the DVD format. The audio compressed data is an audio data which has been compressed by the MPEG2, i.e., audio streams in the DVD format.

The demultiplexer 5 supplies the main video compressed data to the video decoder 6, the sub video compressed data to the sub video decoder 7, and the audio compressed data to the audio decoder 8.

The video decoder 6 carries out decoding of the main video compressed data and creates a main video data spread by the decoding. This video decoder 6 has a memory for three frames for carrying out the decoding. That is, the I-picture, P-picture, and B-picture of the MPEG2 format are decoded and stored in the memory of the video decoder 6, and the respective pictures decoded are outputted from this memory. It should be noted that this memory may have a capacity for more than three frames. The video decoder 6 supplies the main video data created to the sub video decoder 7.

The sub video decoder 7 carries out decoding of the sub video compressed data and combines this sub video data decoded with the main video data supplied from the video decoder 6, so as to create a video data. That is, the sub video decoder 7 combines the main video data with a superimposed caption and the like reproduced as a sub video data. It should be noted that if no sub video data is present, this sub video decoder 7 outputs the main video data as it is. The sub video decoder 7 supplies the video data created to the NTSC conversion circuit 9.

The audio decoder 8 carries out decoding of the audio compressed data and creates an audio data spread. That is, if the audio compressed data has been compressed by the MPEG2 format, the audio decoder 8 carries out the corresponding spread processing and creates an audio data. It should be noted that if this audio data has been coded by a format other than MPEG2, such as the PCM, the corresponding decoding is carried out. The audio decoder 8 supplies the audio data created to the D/A conversion circuit 10.

The NTSC conversion circuit 9 converts the video data from a digital data into a television signal such as the NTSC or PAL for output. This output is supplied to a monitor or the like so that the user can view the pictures reproduced from the recording medium 1.

The D/A conversion circuit 10 converts the audio data which is a digital data into an analog audio data for output. This output is supplied to a speaker or the like so that the user can hear the sound reproduced from the recording medium 1.

The controller 11 controls the pickup 2, the RF circuit 3, the data decoder 4, the demultiplexer 5, the video decoder 6, the sub video decoder 7, the audio decoder 8, the NTSC conversion circuit 9, and the D/A conversion circuit 10.

Moreover, this controller 11 is supplied with an operation input through the user interface 12 realized as an operation panel and a remote controller, and the controller 11 controls the respective circuits according to the operation input.

Moreover, the controller 11 makes the memory 13 store control data and controls the respective circuits according to the data stored in the memory 13.

Figure 2:
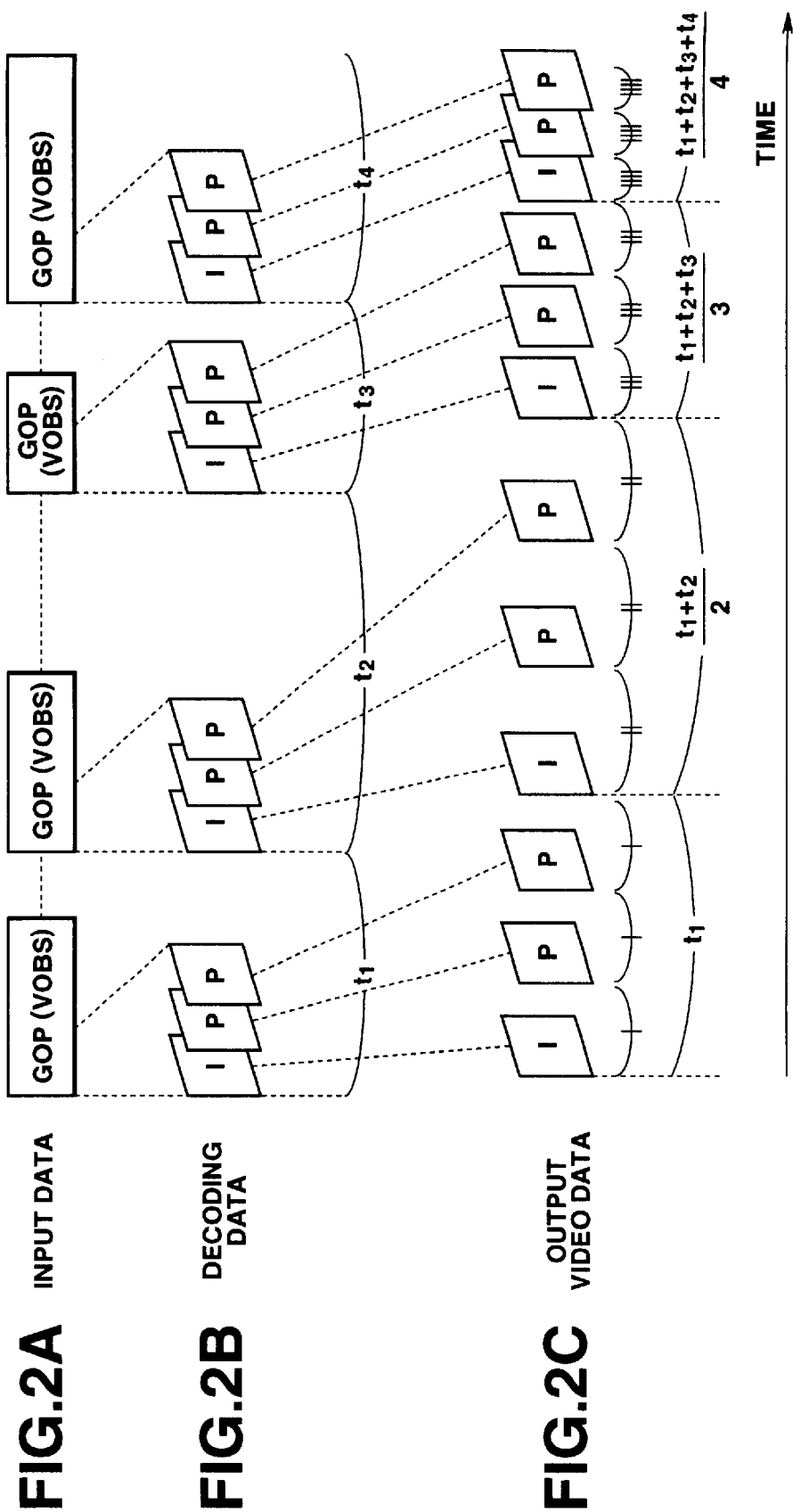
FIG. 2 explains the concept of a data decoding method used when a main video compressed data is supplied to a video decoder according to the present invention.

The DVD reproduction apparatus 100 can carry out a special reproduction such as a forward and backward high-speed reproduction of a video signal. FIG. 2 shows a concept of a data decoding method when a main video compressed data is supplied to the video decoder according to the present invention. Description will now be directed to the forward and the backward high-speed reproduction by the DVD reproduction apparatus 100 with reference to FIG. 2.

The video decoder 6 is successively supplied with, for example, GOP (Group of pictures) in the MPEG format. It should be noted that the video data supplied to this video decoder 6 may be in the unit other than the GOP, such as the VOBU (Video Object Unit). The VOBU will be detailed later.

FIG. 2A shows a case of forward high-speed reproduction of main video compressed data supplied to the video decoder 6, in which a predetermined number of GOPs are skipped in the time axis direction and the GOPs are supplied intermittently to the video decoder 6. This intermittence interval varies depending on the speed of the high-speed reproduction which is controlled by the controller 11 according to the user operation. There is also a reproduction speed which allows the GOPs to be supplied successively to the video decoder 6 without any skipping.

When a GOP is supplied, as shown in FIG. 2B, the video decoder 6 decodes the first three I pictures (intra-frame prediction coded picture data) or P-pictures (frame-to-frame forward prediction coded picture data). That is, the main video compressed data decoded by the video decoder 6 may be three I-pictures if the first three pictures of the GOP data stream are I-pictures; or two I-pictures and one P-picture if they are the first three pictures; or one I-picture and two P-pictures if they are the first three pictures. Moreover, if the GOP does not contain three or more I-pictures or three or more P-pictures, one or two I-pictures alone are decoded.

The video decoder 6 decodes the first three I-pictures or P-pictures of the GOP and stores the video data decoded in the memory provided in the video decoder 6. The remaining data of the GOP is discarded. It should be noted that it is also possible to discard an unnecessary data prior to supplying it to the video decoder 6. That is, the video decoder 6 is supplied with only a management data such as a header and the first three I-pictures or P-pictures. For example, according to control by the controller 11, discarding of an unnecessary data can be carried out at an earlier stage than the video decoder 6, for example by the data decoder 4 or by the demultiplexer 5 which divides the audio data.

The video decoder 6 successively outputs the I-pictures and P-pictures decoded from the memory in the temporal order according to control of the controller 11. During this process, the video decoder 6, according to the interval of GOP supplied, averages the outputting interval for output the video data. For example, as shown in FIG. 2, if the GOP interval is $t_1$, $t_2$, $t_3$, and $t_4$, the three I-pictures corresponding to the first GOP supplied are outputted with an out interval of $t_1/3$. The output interval of the I-pictures corresponding to the second GOP is set to $((t_1+t_2)^2/3$. The output interval of the I-pictures corresponding to the third GOP is set to $((t_1+t_2+t_3)/3)/3$. The output interval of the I-pictures corresponding to the fourth GOP is set to $((t_1+t_2+t_3+t_4)/4)/3$.

That is, the intervals between GOPs supplied are not identical because of various factors such as the data compression ratio and the picture type or the access time from the recording medium 1. Furthermore, the decoding time of the video decoder 6 also varies according to the pictures. For this, if the data which has been decoded is directly outputted, the output intervals are scattered, resulting in pictures causing a strange feeling. To cope with this, this video decoder 6 detects the interval of the GOP supplied and carries out averaging of the speed of the data outputted. It should be noted that this averaging is carried out by sampling a plurality of GOP intervals. This sampling number may be set to 30 GOPs, discarding the older samples.

Moreover, the GOP intermittence interval detected for the averaging may be determined by detecting the timing when the data decoder 4 supplies the GOP to the demultiplexer 5, or the timing when the GOP is fetched by the demultiplexer 5, or the timing when the demultiplexer 5 supplies the GOP to the video decoder 6.

On the other hand, when a backward high-speed reproduction is carried out, the video decoder 6 is intermittently supplied with GOPs skipped in the reverse direction to the time axis direction.

When the video decoder 6 decodes the GOPs supplied in the reverse direction to the time axis, in the same way as the forward reproduction, the decoding starts with the head of the GOP. The first three I-pictures and P-pictures decoded from the GOP are stored in the memory of the video decoder 6.

The video decoder 6 stores the three I-pictures of the GOP in the memory. In this case, output is started with the last picture decoded, i.e., in the reverse direction to the time axis. The video decoder 6 carries out averaging similar to the aforementioned averaging in the forward reproduction.

By the way, when carrying out a special reproduction such as the forward and backward high-speed reproduction of a video signal, the video decoder 6 may be supplied with a GOP containing no video compressed data. This happens, for example, when still pictures are continuously outputted, i.e., a so-called video gap is caused. In the case of the video gap, the video decoder 6 cannot decode three I-pictures or P-pictures.

In such a case, if in a forward high-speed reproduction, the video decoder 6 decodes main video compressed data up to the picture immediately before the no-data state and continues to output the video data until a GOP containing video data appears. Moreover, in a backward high-speed reproduction, the video decoder 6 decodes a main video compressed data of the GOP containing a picture immediately before the next no-data state and outputs the picture immediately before the no-data state until this GOP appears.

Next, description will be directed to the forward high-speed reproduction (hereinafter, referred to forward scan or FWD-scan) and the backward high-speed reproduction (hereinafter, referred to as backward scan or BWD-scab) by the DVD reproduction apparatus 100 in a case when the recording medium is a DVD-VIDEO disc, specifically by using the DVD-VIDEO disc format.

Firstly, prior to the explanation of the processing, a brief explanation will be given on this DVD-VIDEO disc format as well as various management information, attributes, search information, and the like used in the FWD-scan and BWD-scan.

Figure 3:
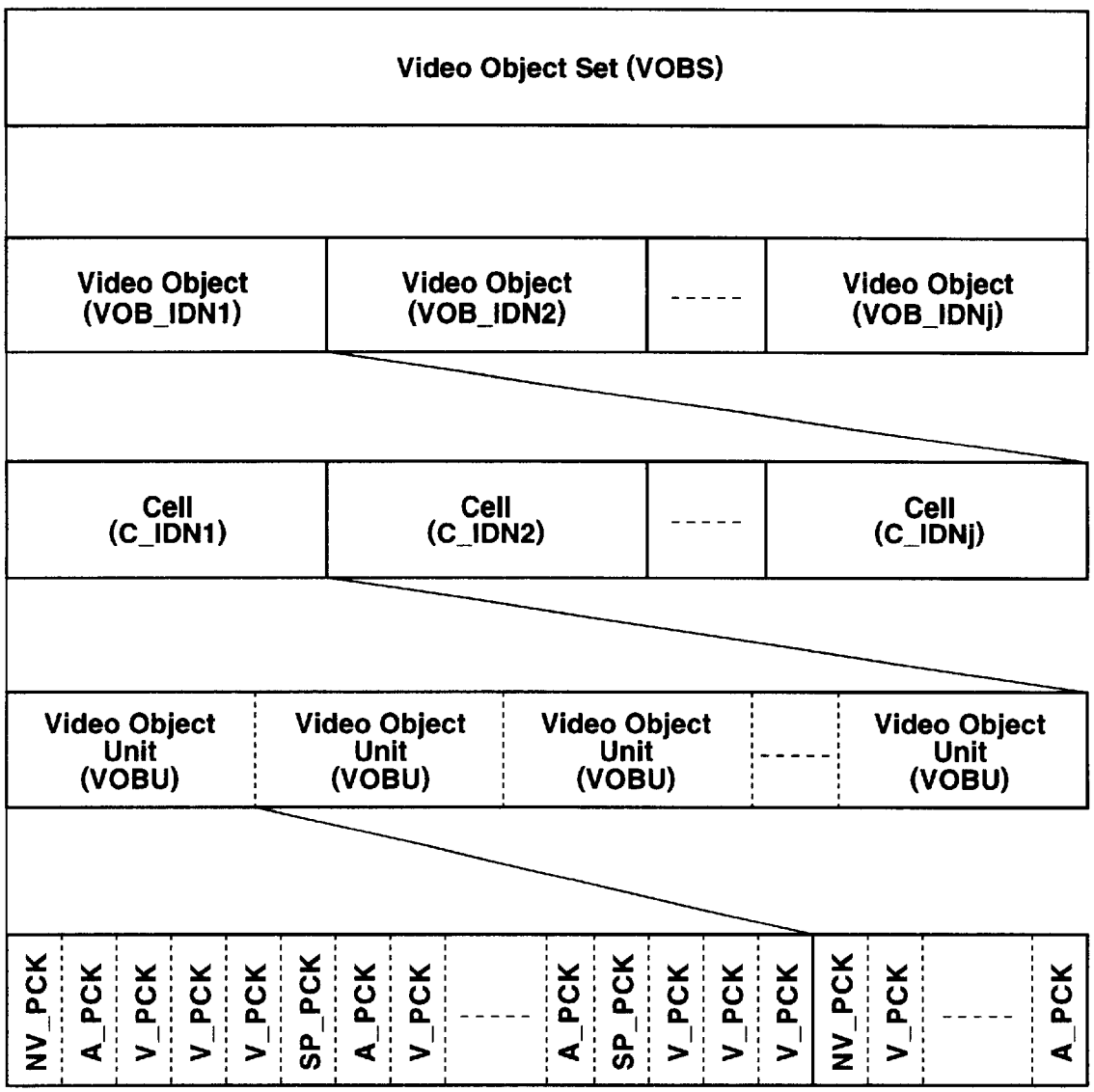
FIG. 3 explains the DVD-VIDEO format.

As shown in FIG. 3, on the DVD-VIDEO disc, management of a main video data, a sub video data, and an audio data is carried out in the video object set (VOBS) unit. This VOBS, for example, represents one movie work. A VOBS consists of a plurality of video objects (VOB). The VOB is a unit containing a group of data recorded on the disc. Moreover, the VOBS consists of a plurality of cells. The cell, for example, corresponds to one scene or one cut in a movie. One cell corresponds to a time of several minutes to ten and some minutes. Moreover, in the DVD, there are provided, for example, a multi-story format which enables to view one movie in a plurality of story variations and a parental lock function which enables to skip educationally undesirable scenes such as violence scenes. These functions are created by combination of the cells.

Each cell consists of a plurality of video object units (VOBU). The VOBU is a unit corresponding to 0.4 to 1.2 seconds of motion pictures and contains a plurality of GOP (group of pictures) in the MPEG2 format.

Each VOBU consists of NV_PCK which is a pack containing the VOBU management information, V_PCK which is a pack containing a main video data, A_PCK which is a pack containing an audio data, and SP_PCK which is a pack containing a sub video data. Each of the V_PCK, A_PCK, and SP_PCK has been compressed by the MPEG2 format and recorded on the recording medium 1.

In the DVD-VIDEO disc format, the respective data having the aforementioned configuration is managed by various management information. When reproducing a video data from the recording medium 1, the controller 11 fetches the management information from the recording medium 1 and stores it in the memory 13 so as to be used for controlling a data reproduction or the like.

Figure 4:
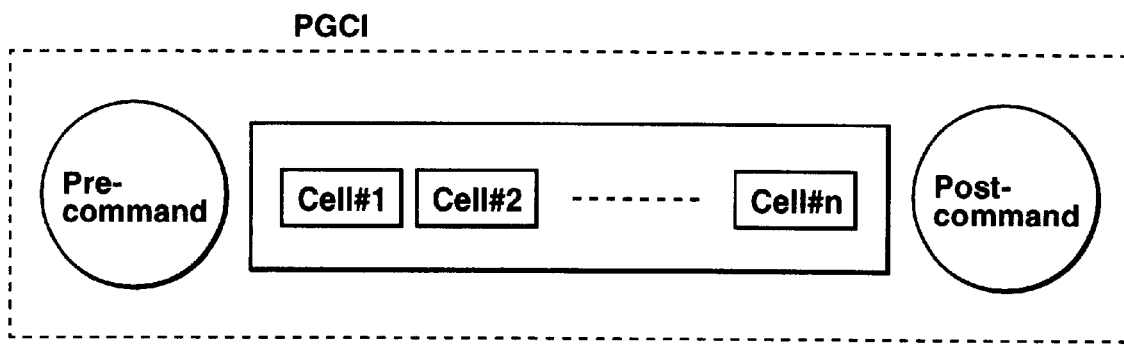
FIG. 4 explains the DVD-VIDEO format.

For example, management of each cell is carried out on the management basis called PGC (program chain). This PGC management information is contained in the program chain information (PGCI) shown in FIG. 4. Each PGCI has a pre-command containing a management information of a preceding PGC and a post-command containing a management information of a following PGC. Moreover, this PGCI contains information such as reproduction order of the cells which are under management of this PGC. When reproducing a movie or the like, the controller 11 reads in advance the PGCI from the recording medium 1 and stores the PGCI in the memory 13. According to the information of this PGCI, the controller 11 controls the respective components so as to successively reproduce the cells specified.

Figure 5:
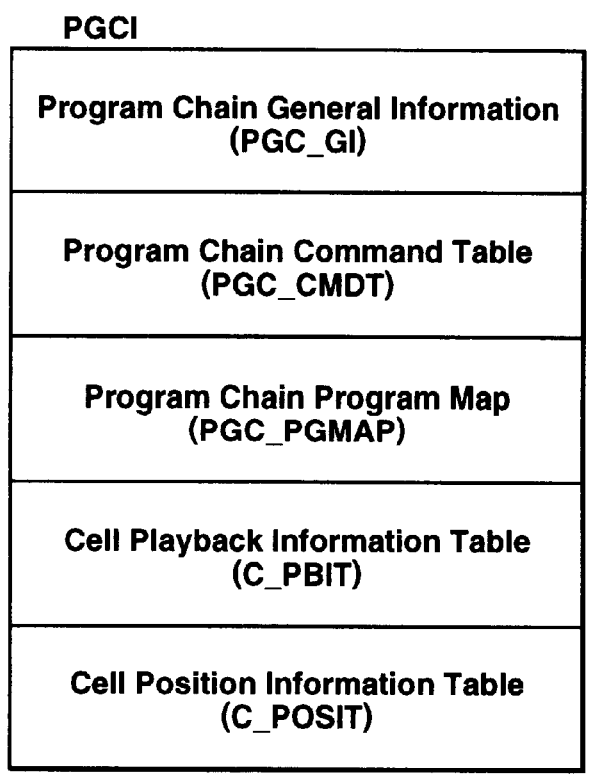
FIG. 5 explains the DVD-VIDEO format.

As shown in FIG. 5, the PGCI contains management information items such as a program chain general information (PGC_GI), a program chain command table (PGC_CMDT), a program chain program table (PGC_PGMAT), a cell playback information table (C_PBIT), and a cell position information table (C_POSIT).

The PGC_GI contains information concerning the entire PGC such as information contents of the PGC and a time information of the entire PGC. The PGC_CMDT contains an information indicating a relationship between this PGC and the preceding and following PGCs such as information of the aforementioned pre-command and post-command. The PGC_PGMAT contains a program starting cell number for each program. The C_PBIT contains information such as a reproduction time of each cell. The C-POSIT contains an ID number which is a serial number of VOBs in each cell.

Figures 6, 7:
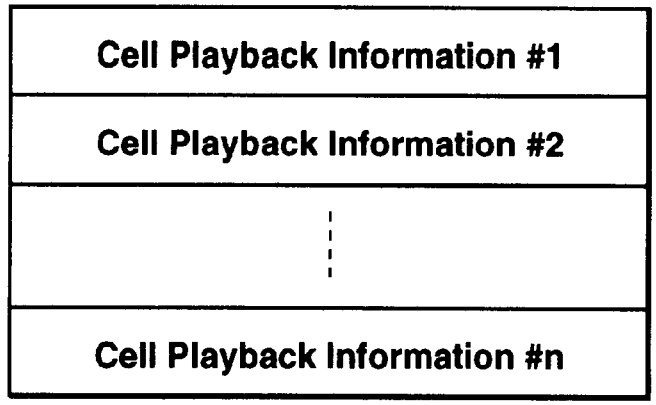
FIG. 6 explains the DVD-VIDEO format.
FIG. 7 explains the DVD-VIDEO format.

As shown in FIG. 6, the C_PBIT contains a cell playback information (C_PBI) of management information such as a reproduction time for each of the cells constituting this PGC. As shown in FIG. 7, the C_PBI of each cell includes as a management information: C_CAT, C_PBTM, C_FVOBU_SA, C_FILVU_EA, C_LVOBU, and C_LVOBU_EA. The C_CAT indicates a category information of this cell. The C_PBTM indicates a total reproduction time of the cell. The C_FVOBU_SA indicates the start address of the first VOBU in this cell. The C_FILVU_EA indicates the end address of the last VOBU interleaved in this cell. The C_LVOBU_SA indicates the start address of the last VOBU of the cell. The C_LVOBU_EA indicates the end address of the last VOBU in the cell.

Moreover, management of each VOBU is carried out according to the management pack called navigation pack (NV_PCK). As shown in FIG. 3, this NV_PCK is contained at the head of each VOBU. When reproducing a movie or the like, the controller 11 fetches this NV_PCK through the data decoder 4 and the demultiplexer 5 and stores it in the memory 13. According to the management information of this NV_PCK, the reproduction is carried out.

As shown in FIG. 8A and FIG. 9A, this NV_PCK consists of a presentation control information (PCI) packet containing a video data display control information and a data search information (DSI) packet containing a data search information.

The PCI of NV_PCK, as shown in FIG. 8B, includes: a PCI general information (OCI_GI) containing a management information of the PCI as a whole; an angle information for non-seamless (NSML_AGLI) containing an angle switching information for a non-seamless case; a highlight information (HLI) containing an information for highlight display in a predetermined area when displaying a sub video data or the like; and a recording information (RECI) containing a recording information for the main video data, sub video data, and audio data.

Especially, the PCI_GI, as shown in FIG. 8C, includes NV_PCK_LBM, VOBU_CAT, VOBU_UOP_CTL, VOBU_S_PTM, VOBU_E_PTM, VOBU_SE_E_PTM, and C_ELTM.

The NV_PCK_LBM indicates the address of this NS_PCK. The VOBU_CAT indicates the category of this VOBU. The VOBU_S_PTM indicates the display start time of the first GOP in this VOBU. The VOBU_E_PTM indicates the display end time of the last GOP in this VOBU. The VOBU_SE_E_PTM indicates that the main video data is disconnected in this VOBU. The C_ELTM indicates the time lapse from the head of the cell containing this VOBU. According to this C_ELTM, a time lapse can be displayed on the display screen.

The DSI of the NV_PCK, as shown in FIG. 9B, includes: a DSI general information (DSI_GI) containing a management information of the entire DSI; a seamless playback information (SML_PBI) containing a reproduction management information for a case of seamless; an angle information for seamless (SML_AGLI) containing an angle information in the case of seamless; a VOB unit search information (VOBU_SRI) containing a search information such as a time interval between VOBUs; and a synchronous information (SYNCI) containing a synchronous information indicating a temporal matching between the audio data and the sub video data.

Especially, the DSI_GI, as shown in FIG. 9C, includes NV_PCK_SCR, NV_PCK_LBM, VOBU_EA, VOBU_1STREF_EA, VOBU_2NDREF_EA, VOBU_3RDREF_EA, VOBU_VOB_IDN, VOBU_C_IDN, and C_ELTM.

The NS_PCK_SCR indicates the system clock reference. The NV_PCK_LBN indicates the address of this NV_PCK. The VOBU_EA indicates the end address of this VOBU. The VOBU_1STREF_EA indicates the end address of the first I-picture in this VOBU. It should be noted that if the VOBU contains no I-picture, this data is 0. The VOBU_2NDREF_EA indicates the end address of the second I-picture or P-picture in this VOBU. It should be noted that if this VOBU does not contain two I-pictures or P-pictures, this data is 0. The VOBU_3RDREF_EA indicates the end address of the third I-picture or P-picture in this VOBU. It should be noted that if this VOBU does not contain three I-pictures or P-pictures, this data is 0. The VOBU_VOB_IDN indicates the ID number of this VOBU. The VOBU_C_IDN indicates the ID number of the cell containing this VOBU. The C_ELTM indicates the time lapse from the head of the cell containing this VOBU in the same way as the PCI.

Figure 10:
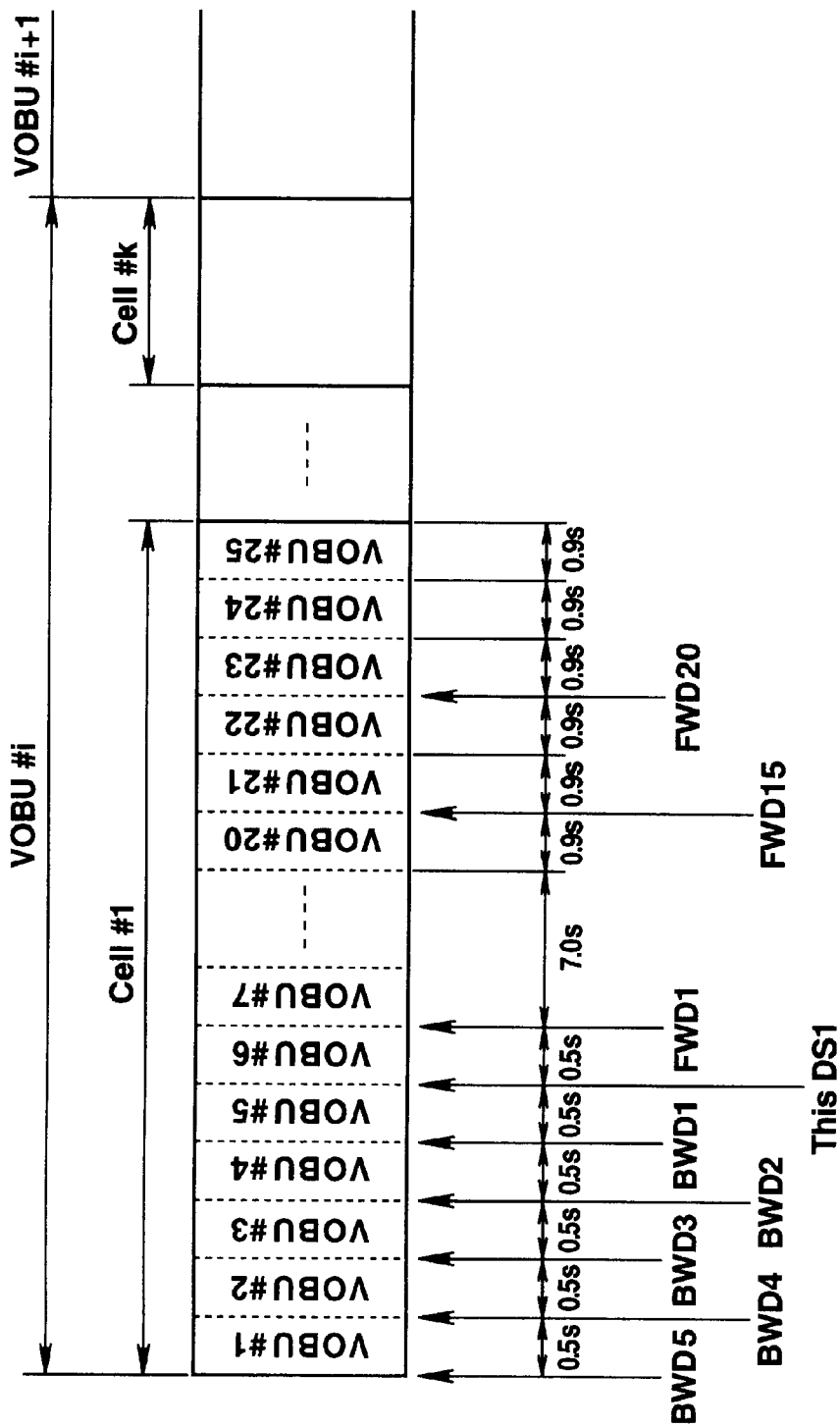
FIG. 10 explains the DVD-VIDEO format.

Moreover, as shown in FIG. 10, the VOBU_SRI of the DSI contains an information indicating a time difference between the current VOBU and other VOBU in the cell. In this VOBU_SRI, for example, FWD1 indicates the address of the VOBU 0.5 seconds after this VOBU and FWD15 indicates the address of the VOBU 7.5 seconds after. Similarly, the address of the VOBU 0.5 seconds before this VOBU is indicated at BWD1, and the address of the VOBU 2.5 seconds before is indicated at BWD5. That is, when carrying out a FWD-scan or BWD-scan, the controller 11 should detect the information of the VOBU_SRI so as to control the reproduction information.

More specifically, as shown in FIG. 11, the VOBU_SRI includes FWDNext, FWDIn, FWDIVideo, BWDprev, BWDIn, and BWDVideo.

The FWDIn indicates the address of the VOBU following this VOBU in the time axis direction. Here, the subscript n represents a time, actually in the unit of n×0.5 seconds. That is, the address of the VOBU 30 seconds after is indicated in FWDI60. Similarly, the BWDIn indicates the address of the VOBU preceding this VOB in the time axis direction. The subscript n represents the same as FWDI. It should be noted that if no VOBU is found before or after a predetermined time within the cell, the last 30 bits of the data indicating this address are all 1. (Note that the VOBU address is indicated by a 4-byte data.) For example, if the VOBU is the first VOBU in the cell, no VOBU precedes this first VOBU and no VOBU is indicated in this VOBU_SRI. Consequently, the address indicating data in BWDI is 3FFFFFFF. Moreover, if the VOBU is the last VOBU in the cell, the address indicating data in the FWDI is 3FFFFFFF.

The FWDINext indicates the address of the next VOBU immediately after this VOBU temporally. Moreover, the BWDIPrev indicates the address of the VOBU immediately before this VOBU temporally.

The FWDIVideo indicates the address of the VOBU containing the next main video data stream. For example, in the case of the so-called video gap when VOBUs containing no main video data continue one after another, the next VOBU containing a main video data is indicated. Moreover, the BWDVideo indicates the address of the VOBU immediately before the main video data stream is disconnected. For example, if this VPBI is preceded by a sequence of VOBUs containing no main video data, the address of the last VOBU containing the main video data is indicated.

Figure 12A:
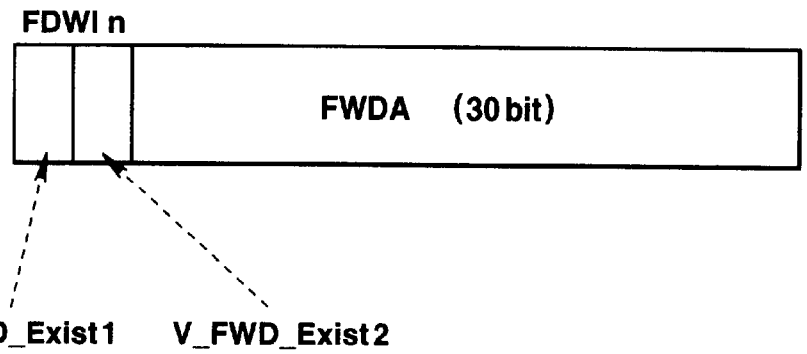
FIG. 12 explains the DVD-VIDEO format.

Moreover, as shown in FIG. 12A, each of the FDWIn data consists of FWDA indicating a data of the address, V_FWD_Exist1, and V_FWD_Exist2. The data of the address, as has been described above, is a 30-bit data indicating the address of the VOBU after a predetermined time. The V_FWD_Exist1 indicates whether the VOBU after this predetermined time contains a main video data. It is 0 if no main video data is contained, and 1 if a main video data is contained. Moreover, the V_FWD_Exist2 indicates whether a main video data exists between the VOBU after a predetermined time and the VOBU immediately before this VOBU in the SRI step of this VOBU. It is 1 if a video data exists, and 0 if no video data exists. For example, in FIG. 11, if a VOBU exists between the FWDI14 and the FWDI15 and if that VOBU contains a video data, then the V_FWD_Exist2 of the FWDI15 becomes 1.

Figure 12B:
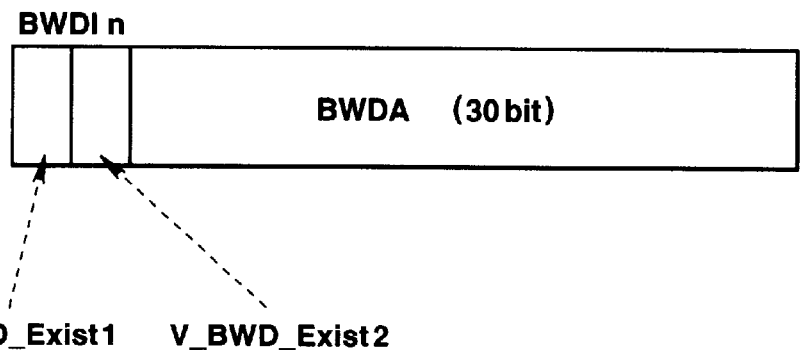

Moreover, as shown in FIG. 12B, each of the BWDIn data consists of a data of address, V_BWD_Exist1, and V_BWD_Exist2. The data of address, as has been described above, indicates the address of the VOBU preceding by a predetermined time. The V_BWD_Exist 1 indicates whether that VOBU preceding by the predetermined time contains a main video data. It is 0 if no data exists, and 1 if the data exists. Moreover, the V_FWD_Exist2 indicates whether a main video data exists between the VOBU after a predetermined time and the VOBU immediately before this VOBU. It is 1 if a video data exists, and 0 if no video data exists.

It should be noted that the address of the aforementioned VOBU_SRI is a relative address indicating a distance from the head of the VOBU. That is, when fetching a data of the VOBU of the address indicated in this VOBU_SRI, for example, FWDIn is added to the address of the VOBU (NV_PCK_LBN) contained in this VOBU_SRI.

Figure 13:
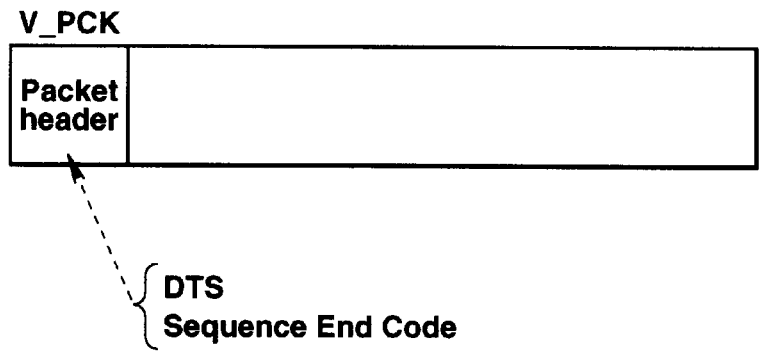
FIG. 13 explains the MPEG2 format.

Thus, a brief explanation has been given on the DVD_VIDEO disc format. When carrying out a FWD-scan or BWD-scan in the DVD reproduction apparatus 100, an information of a packet header of the MPEG format in the V_PCK as shown in FIG. 13 is also used. This packet header contains a decoding time stamp (DTS) serving as a time management information when decoding a video compressed data and a Sequence End code indicating the end of the video data stream.

Next, description will be directed to the FWD-scan and the BWD-scan using the DVD reproduction apparatus 100 with reference to flowcharts.

It should be noted that in this DVD reproduction apparatus 100, the controller 11 controls to determine the VOBU to be supplied to the video decoder 6 so that a necessary VOBU data is supplied to the demultiplexer 5. The controller 11 controls the video decoder 6 so as to carry out a decoding of the main video compressed data necessary for the FWD-scan and the BWD-scan. Furthermore, the video decoded 6 outputs the video data which has been decoder. Here, the data decoder 4 and the video decoder 6 are supplied with a data via the track buffer 4a and the demultiplexer 5. Consequently, there arises a time difference between the processes. For this, the controller 11 controls the data decoder 4 and the video decoder 6 independently from each other. Hereinafter, an explanation will be given on the FWD-scan and BWD-scan concerning the data decoder 4 and the video decoder 6 separately from each other.

Firstly, explanation will be given on the FWD-scan processing carried out by the controller 11 of the DVD reproduction apparatus 100.

Figure 14:
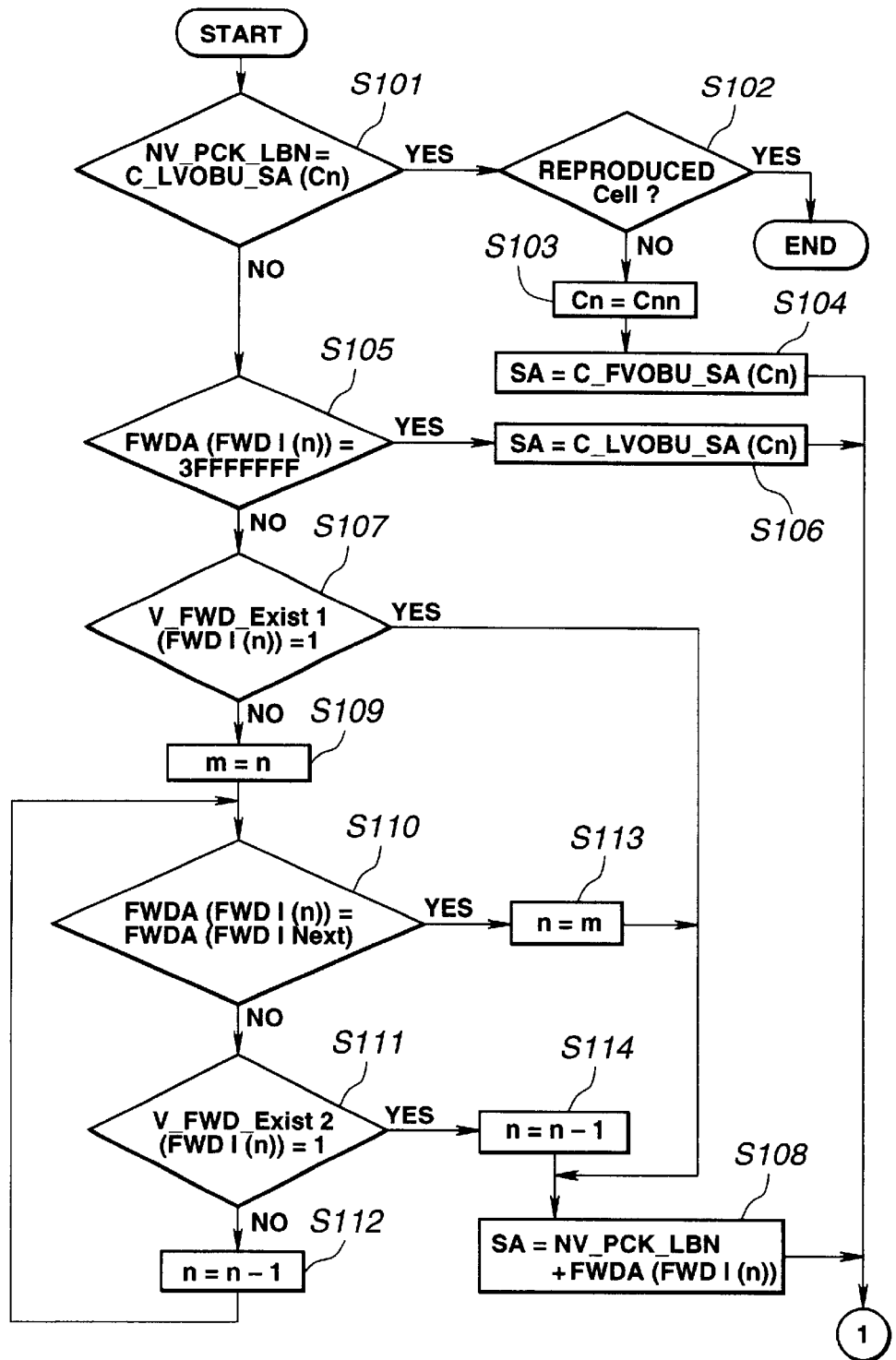
FIG. 14 is a flowchart showing the FWD-Scan processing by the DVD reproduction apparatus according to the present invention.
Figure 15:
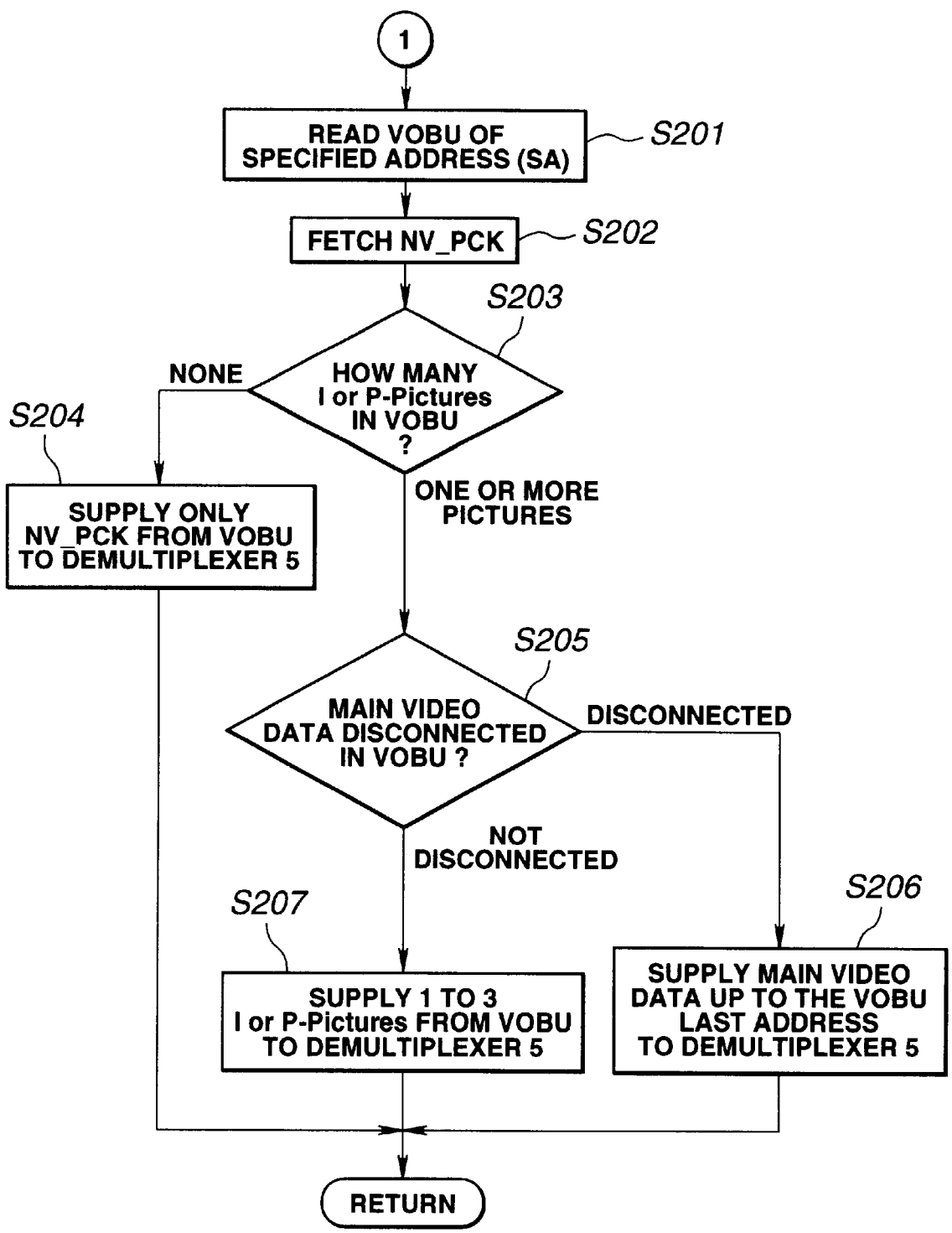
FIG. 15 is a flowchart showing the FWD-Scan processing by the DVD reproduction apparatus according to the present invention.

FIG. 14 and FIG. 15 are flowcharts showing a data supply from the data decoder 4 to the demultiplexer 5 during a FWD-scan.

The controller 11 carries out control of steps S101 to S114 shown in FIG. 14 and sets SA which is an address of the VOBU to be supplied to the demultiplexer 5. It should be noted that the SA is a relative address indicating a distance from the head of VOBS. Moreover, the scan interval is assumed to be n. This scan interval n is, for example, determined by the user operation input. According to this scan interval n, the intermittent interval of VOBU supplied to the demultiplexer 5 is determined. Moreover, this value is a unit similar to the VOBU_SRI contained in NV_PCK; n is an integer and one step lasts 0.5 seconds. This scan interval n corresponds to a high-speed reproduction in the FWD-scan.

In the DVD reproduction apparatus, a user operation input or the like starts the processing of step S101 shown in FIG. 14.

In step S101, the controller 11 determines whether the NV_PCK_LBN is identical to the C_LVOBU_SA(Cn). That is, the address of the NV_PCK of the current VOBU is compared to the address of the last VOBU in the cell to determine whether the current VOBU is the last VOBU in the cell. If the current VOBU is the last VOBU in the cell, control is passed to step S102. Otherwise, control is passed to step S105.

In step S102, the PGCI stored in the memory 13 is referenced to determine whether the current cell is the last cell to be reproduced. If the current cell is the last cell, the processing is terminated. Otherwise, control is passed to step S103 where the cell number is updated to the next cell to be reproduced. In step S104, the address SA of the next VOBU is set to the address C_FVOBU_SA(Cn) of the first VOBU of the updated cell.

Thus, the first VOBU of the next cell is set as the SA in step S104. Consequently, when reproducing an updated cell during a FWD-scan, it is possible to reproduce the first VOBU of the cell.

On the other hand, in step S105, VOBU_SRI in the NV_PCK of the current VOBU is referenced to determine whether current cell contains the VOBU to be scanned. That is, if the lowest 30 bits of FWDIn of VOBU_SRI are all 1, the VOBU is not contained in the cell. If the VOBU to be scanned is not contained in the current cell, control is passed to step S106, and if the VOBU is contained in the current cell, control is passed to step S107.

In step S106, the address SA of the next VOBU is set in the C_LVOBU_SA, i.e., in the last VOBU in the current cell.

Thus, the last VOBU in the cell is set as the SA in step S106. Consequently, when reproducing a cell updating portion during a FWD-scan, it is possible to reproduce the last VOBU in the cell.

On the other hand, in step S107, the V_FWD_Exist 1 of the VOBU_SRI in the NV_PCK of the current VOBU is referenced to determine whether a video data is contained in the VOBU to be scanned. That is, if the V_FWD_Exist1 of the FWDIn of the VOBU_SRI is 1, the VOBU contains a video data. If the VOBU to be scanned has a video data, control is passed to step S108. If no video data is contained, control is passed to step S109.

In step S108, as the address SA of the next VOBU from which a data is to be fetched, the current VOBU address NV_PCK_LBN added by the FWDA (FWDIn) is set. That is, a VOBU at a distance according to the scan interval n is set. Here, the address is added because the address indicated by VOBU_SRI is a relative address from the VOBU head.

Thus, by setting a VOBU at the temporal scan interval n as SA, it is possible to reproduce VOBU at the scan interval n during the FWD-scan.

On the other hand, in step S109, the value n is substituted in m so as to temporarily saving the value of n.

In step S110, it is determined whether the address of the VOBU to be scanned is identical to the address of the next VOBU following the current VOBU. That is, the address of the VOBU to be scanned is compared to the address of the FWDINext indicated in the VOBU_SRI. If the address of the VOBU to be scanned is identical to the address of the next VOBU following the current VOBU, control is passed to step S113. Otherwise, control is passed to step S111.

In step S111, the V_FWD_Exist2 to be scanned is referenced according to the VOBU_SRI to determine whether a video data exists between the VOBU to be scanned and a VOBU preceding this VOBU on the SRI. That is, if V_FWS_Exist2 of FWSIn of VOBU_SRI is 1, an intermediate VOBU contains a video data. If a video data exists between the VOBU to be scanned and the VOBU preceding that VOBU on the SRI, control is passed to step S114. Otherwise, control is passed to step S112.

In step S112, the value n is decremented and the processing of S110 and after is repeated. That is, the loop processing of this step S110 to step S112 determined whether a video data exists between the VOBU to be scanned and the current VOBU.

In this loop of steps S110 to S112, n is decremented by one for each time. If no video data exists and when FWDA (FWDI (n))=FWDA (FWDINext), control is passed from this loop to step S113 where the temporarily saved n is fetched and then to step S108 where the SA is set.

Thus, when no video data exists, i.e., during a video gap (excluding the video gap start and end), a VOBU containing no video data is set.

Moreover, in this loop of step S110 to S112, if a video data is found while the value n is decremented, V_FWD_Exist2 (FWDI (n))=1 and control is passed from step S111 to step S114 where the value n is deleted by 1 and control is passed to step S108 where SA is set. It should be noted that during this process the value n fluctuates. In step S108, this scan interval is reset to the initial scan interval n.

Consequently, when a video data exists, i.e., when a video gap starts, a video data immediately before the video gap start is fetched. It should be noted that if a VOBU exists between steps in the VOBU-SRI and in this VOBU the video data is disconnected, as the SA is set the address of the VOBU immediately before the disconnection of the video data in the processing loop of the next step S201.

After controlling the aforementioned steps S101 to S114 to set the SA which is the address of the next VOBU from which a data is to be fetched, the controller 11 starts the processing of steps S201 and after shown in FIG. 15.

In step S201, the controller 11 makes the data decoder 4 read from the recording medium 1 a data of the VOBU at the specified address SA, and in step S202, fetches NV-PCK of the VOBU of the specified address.

After the NV-PCK is fetched, step S203 determines how many I-pictures or P-pictures are contained in the current VOBU which has been read in by the data decoder 4. This decision is made by retrieving information indicated in VOBU_1STREF_EA, VOBU_2NDREF_EA, and VOBU_3RDREF_EA. Firstly, if the VOBU_3RDREF_EA is other than 0, three or more I-pictures are contained. Secondly, if the VOBU_3RDREF_EA is 0 and the VOBU_2NDREF_EA is other than 0, then two I-pictures or the like are contained. Thirdly, if the VOBU_3RDREF_EA and the VOBU_2NDREF_EA are 0 and the VOBU_1STREF_EA is other than 0, then one I-picture is contained. In other than the aforementioned three cases, no I-pictures or P-pictures are contained.

If the contains no I-picture or no P-picture, control is passed to step S204. If at least one I-picture or P-picture is contained, control is passed to step S205.

In step S204, assuming that no main video data exists in the VOBU, only the data of the NV-PCK is supplied to the demultiplexer. That is, if no main video data exists, no decoding of a video data is required in the video decoder 6, the other data is discarded in advance and only a necessary management data is supplied. It should be noted that if an audio data which is not the main video data is contained, this audio data can also be supplied together with the NV-PCK to the demultiplexer 5.

Thus, by the processing of this step S204, no unnecessary data is supplied to the video decoder 6, enabling the video decoder 6 to carry out a decoding at a high speed with a higher efficiency.

On the other hand, in step S205 it is determined whether the main video data is disconnected in this VOBU. That is, it is determined whether a so-called video gap starts in this VOBU. This decision is made by detecting the VOBU_SE_E_PTM of PCI of the NV_PCK or the sequence-end-code in the MPEG. If it is determined that the main video data is disconnected in the VOBU, control is passed to step S206. If it is determined that the main video data is not disconnected, control is passed to step S207.

In step S206, a data up to the VOBU_SE_E_PTM of this VOBU is supplied to the demultiplexer 5, so as to enable to output a video data up to immediately before the main video data disconnection.

Consequently, if the main video data is disconnected in this step S206, the main video data up to the last data is supplied to the demultiplexer, so that if a so-called video gap is caused, the video data immediately before the video gap can be displayed for carrying out the FWD-scan.

In step S207, one to three I-pictures or P-pictures in the VOBU are supplied to the demultiplexer 5. That is, if in step S203 it is determined that the VOBU contains only one I-picture, data of the one I-picture is supplied to the demultiplexer 5, discarding the other data. If in step S203 it is determined that the VOBU contains only two I-pictures or P-pictures, a data of the two I-pictures or the like is supplied to the demultiplexer 5, discarding the other data. Moreover, if in step S203 it is determined that the VOBU contains three or more than three I-pictures or P-pictures, a data of the first three I-pictures or the like is supplied to the demultiplexer 5, discarding the other data. It should be noted that the demultiplexer 5 is supplied with a data up to the address indicated in the aforementioned VOBU_1STREF_EA, VOBU_2NDREF_EA, and VOBU_3RDREF_EA.

Consequently, the demultiplexer 5 is supplied with only the data of up to three I-pictures and P-pictures required for the FWD-scan, it is possible to carry out an effective decoding in the video decoder 6.

It should be noted that if an audio data or the like which is not the main video data is contained, this audio data can also be supplied together with the NV_PCK to the demultiplexer 5.

After a data is supplied to the demultiplexer 5 in steps S204, S206, and S207, control is returned to step S101 of the aforementioned FIG. 14 to fetch the next VOBU data.

Figure 16:
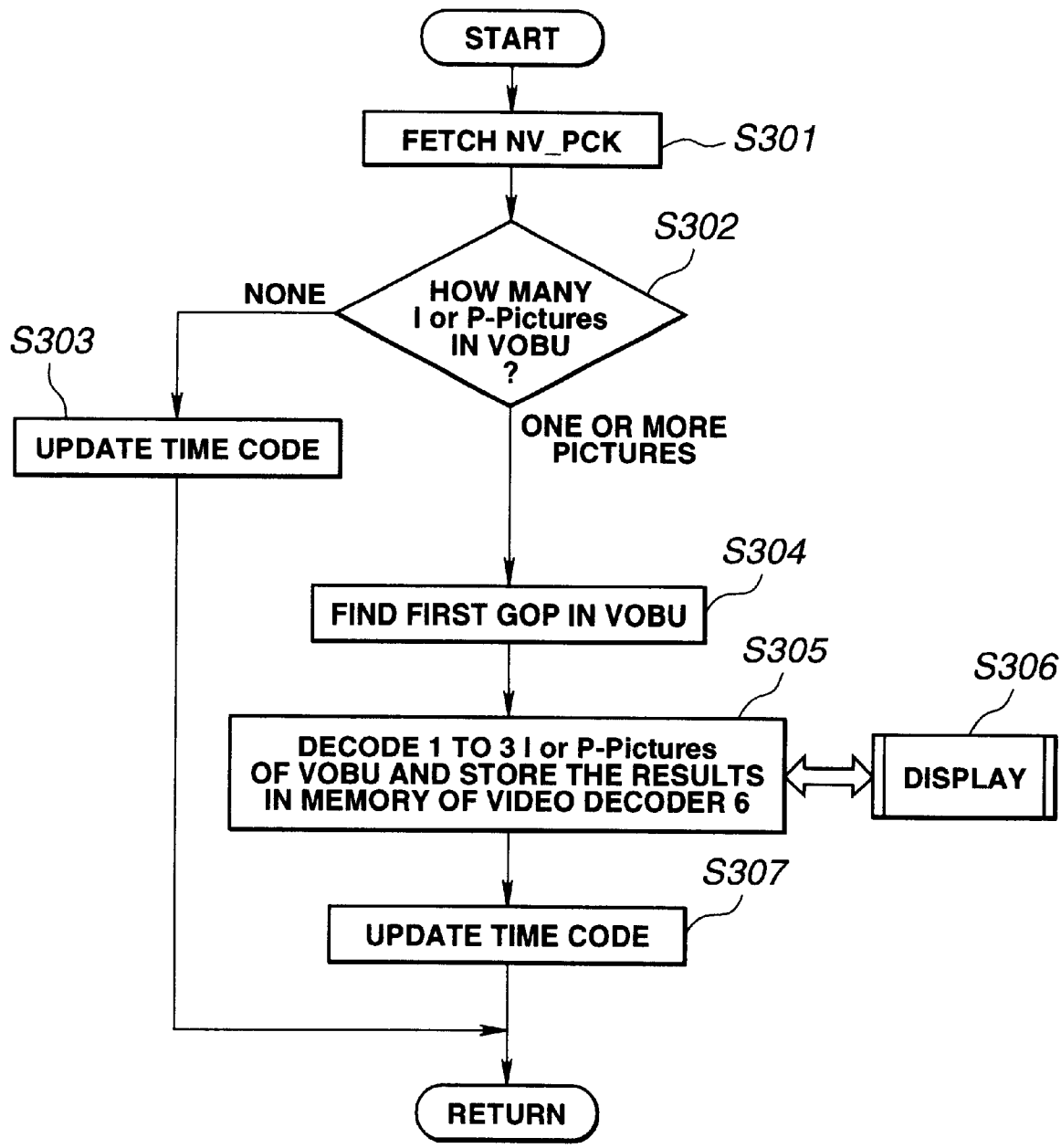
FIG. 16 is a flowchart showing the FWD-Scan processing by the DVD reproduction apparatus according to the present invention.

Next, description will be directed to control of the decoding in the video decoder 6 with reference to the flowchart of FIG. 16.

The controller 11 starts the processing of step S301 when a VOBU is supplied to the video decoder 6 form the demultiplexer 5.

In step S301, the NV-PCK of the VOBU supplied to the video decoder 6 is fetched. It should be noted that the NV-PCK is fetched in the aforementioned processing of the data decoder 4 and the NV_PCK is again fetched in the stage of the processing by this video decoder 6 because there is a time difference between the data decoder 4 and the video decoder 6 and the controller 11 carries out a parallel processing. When the NV_PCK is fetched, control is passed to step S302.

Step S302 determines how many I-pictures or P-pictures are contained in this VOBU. The processing of this step S302 is identical to the aforementioned processing of step S203 in the data decoder 4. If the VOBU contains no I-picture or P-picture, control is passed to step S303. If the VOBU contains at least one I-picture or P-picture, control is passed to step S304.

In step S303, the C_ELTM of the NV_PCK is detected and updates the time code. In this step S303, no decoding of a new video data is carried out but the video data outputted (or displayed) from this video decoder 6 is a video data which has been outputted by a temporally preceding processing, resulting in a still picture on the display. That is, in the so-called video gap caused when no video data exists, the video data immediately before the video data disconnection is outputted while only the time information is updated.

On the other hand, in step S304, the first GOP in the VOBU is found. That is, a VOBU contains a plurality of GOPs and it is necessary to find a first GOP within the VOBU. In this step S304, the DTS is updated until the following conditions are satisfied: DTS≧(VOBU_S_PTM−3×Ts1Field) and DTS≦(VOBU_S_PTM−2×Ts1Field). Here, the Ts1Field represents a time of one field, which is ⅙ seconds in the NTSC and 1/50 seconds in the PAL.

That is, when a difference between the decoding start time and the display start time has reached to a time of 2 to 3 fields, decoding is started as the first GOP of the VOBU. This is because a gap between a decoding start and an output of the video decoder 6 is one field, and further in the DVD-VIDEO format, one picture can contain 2 to 3 fields of video data.

When the first GOP of the VOBU is found, in step S305, the one to three I-pictures or P-pictures fetched in step S302 are decoded and stored in the memory of the video decoder 6.

Moreover, the video decoder 6, in step S306, decodes a video data corresponding to the three pictures in the memory and outputs a video data for display. Here, the output processing is carried out in parallel to the decoding processing and the pictures which have been decoded are successively outputted. It should be noted that this output processing (display processing) will be detailed later.

Moreover, in step S305, the controller 11 fetches the VOBU_SE_E_PTM of the NV_PCK and determines whether the video data is disconnected in this VOBU. That is, it is determined whether a video gap starts in this VOBU. If it is determined that the video data is disconnected according to the VOBU_SE_E_PTM, a data up to immediately before the disconnection of the video data is decoded. The video data decoded is stored in the memory and output processing is carried out. Thus, in step S305 the video data up to immediately before the disconnection of the main video data is decoded, so that when a so-called video gap is caused, it is possible to carry out the FWD-scan by displaying the video data immediately before.

After the video data decoded is stored in the memory, in step S307 the time code is updated in the same way as the aforementioned step S303.

After the time code is updated in step S303 and in step S307, the processing of steps S301 and after is repeated to fetch the NV_PCK of the next VOBU.

Next, description will be directed to the BWD-scan carried out by the controller 11 of the DVD reproduction apparatus 100. It should be noted that the same processes as in the aforementioned FWD-scan will not be detailed below.

Figure 17:
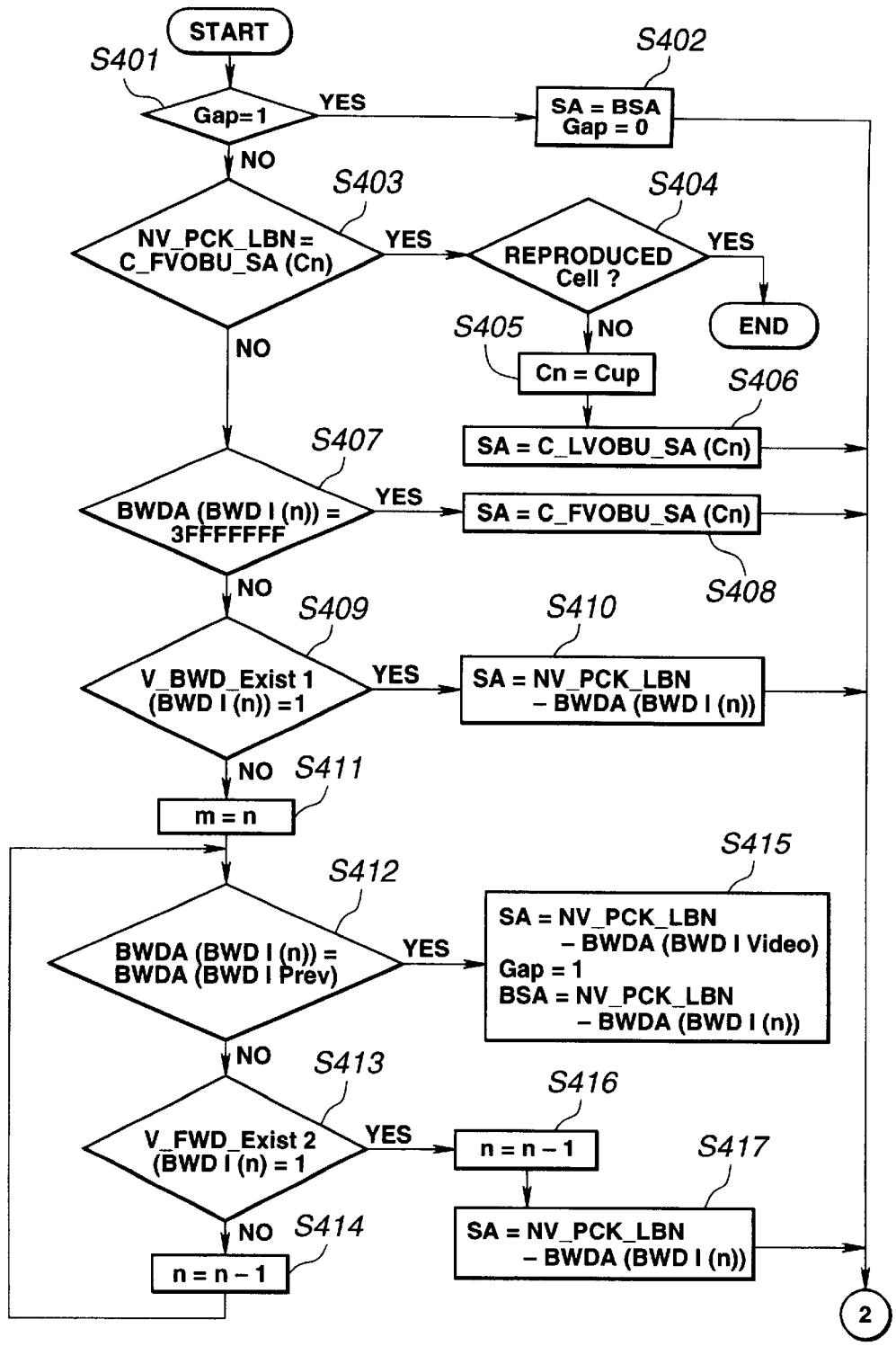
FIG. 17 is a flowchart showing the BWD-Scan processing by the DVD reproduction apparatus according to the present invention.
Figure 18:
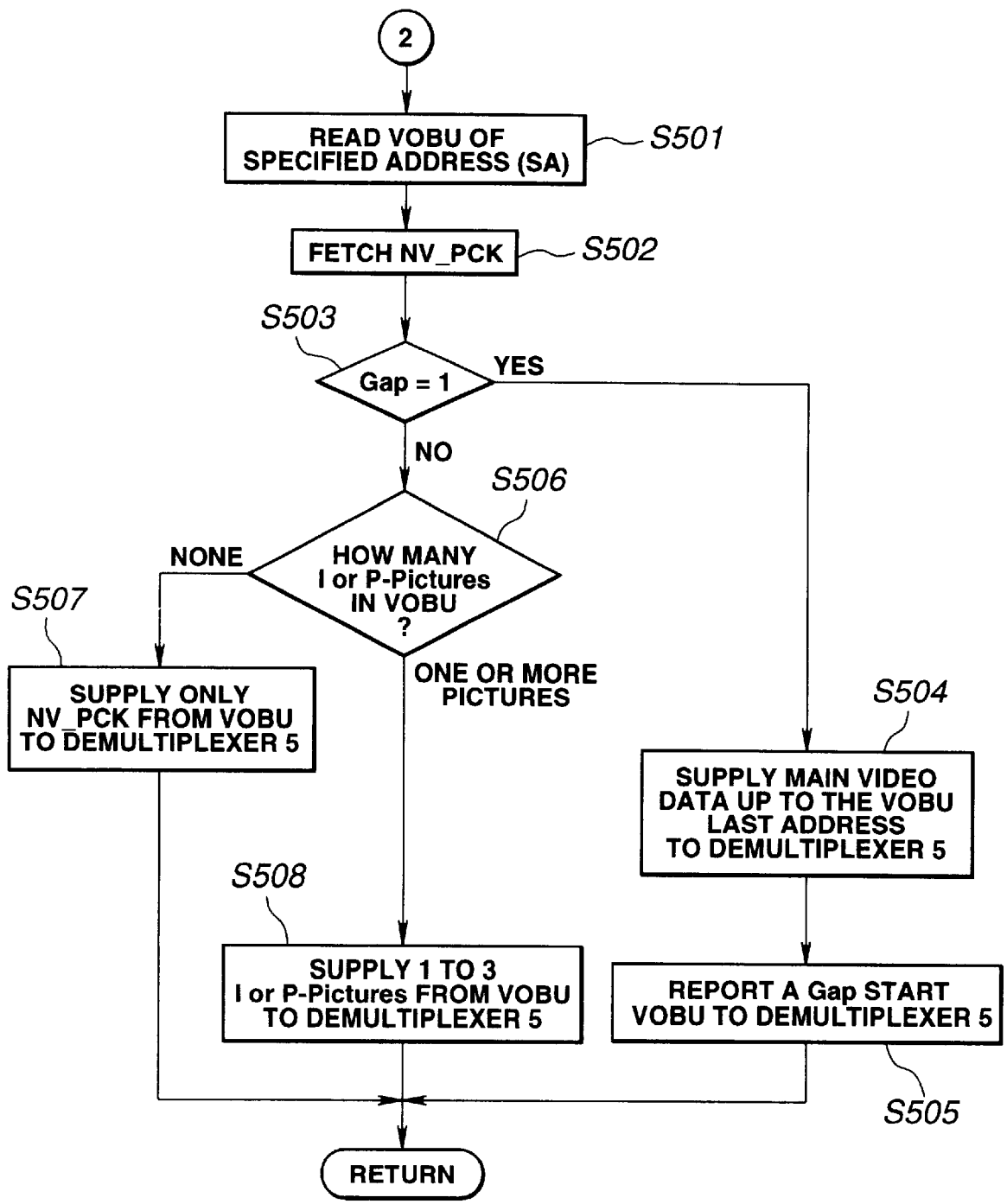
FIG. 18 is a flowchart showing the BWD-Scan processing by the DVD reproduction apparatus according to the present invention.

FIG. 17 and FIG. 18 are flowcharts showing a data supply processing from the data decoder 4 to the demultiplexer 5 during a BWD-scan.

The controller 11 carries out control of steps S401 to S417 shown in FIG. 17 and sets the SA which is the address of the VOBU supplied to the demultiplexer 5. Moreover, the scan interval is assumed to be n. This scan interval, for example, is determined by a user operation input. According to this scan interval n, the intermittence interval of the VOBU supplied to the demultiplexer 5 is determined. That is, this scan interval n corresponds to a high-speed reproduction in the backward direction along the time axis in the BWD-scan. It should be noted that unlike the aforementioned FWD-scan, the VOBU search is carried out in the opposite direction to the time axis at this scan interval. Consequently, the scan interval n in the BWD-scan is in a different direction from that of the FWD-scan.

In the DVD reproduction apparatus 100, a user operation input or the like starts the processing of step S401 in FIG. 17.

In step S401, the controller 11 determines whether the Gap is 1. This Gap is a variable used for a BWD-scan, when reproducing a VOBU in a so-called video gap where the video data is disconnected. This Gap is set in step S415 which will be described later and its initial value is 0. When this Gap is 1, i.e., when the current VOBU is a VOBU of a video gap portion, control is passed to step S402. If the Gap is not 1, control is passed to step S403.

In step S402, the Gap is set to 0, and the SA is set to BSA. Here, the BSA is set in step S415 in the same way as the Gap.

On the other hand, in step S403, it is determined whether the NV_PCK_LBN is identical to the C_FVOBU_SA (Cn). That is, the address of the NV_PCK is compared to the initial address of the current cell so as to determine whether the current VOBU is the first VOBU of the current cell. If the current VOBU is the first VOBU of the cell, control is passed to step S404. Otherwise, control is passed to step S407.

In step S404, the PGCI stored in the memory 13 is referenced to determine whether the current cell is the reproduction end cell. If the current cell is the reproduction end cell, the processing is terminated. Here, the reproduction end means an end of a reproduction of BWD-scan, for example, a movie starting cell if in a movie or the like. If not the reproduction end cell, control is passed to step S405 where the cell number is updated to the next cell to be reproduced. In step S406, the address SA of the next VOBU from which a data is to be fetched is set in the last VOBU address of the updated cell C_LVOBU_SA (Cn).

Thus, in step S404 the last VOBU of the next cell is set as the SA, which enables when reproducing a cell change portion during the BWD-scan, it is possible to start at the cell end.

On the other hand, in step S407, the VOBU_SRI in the NV_PCK of the current VOBU is referenced to determine whether the VOBU to be scanned is contained in the current cell. That is, if the lowest 30 bits of VWDIn of VOBU_SRI are all 1, the VOBU is not contained in the cell. If the current cell does not contain the VOBU to be scanned, control is passed to step S408. If the current cell contains the VOBU to be scanned, control is passed to step S409.

In step S408, the address SA of the next VOBU from which a data is to be fetched is set in the C_FVOBU_SA, i.e., in the first VOBU in the current cell.

Thus, in step S408, the first VOBU of the cell is set as the SA, which enables to reproduce the cell head when reproducing a cell change portion during the BWD-scan.

On the other hand, in step S409, the VOBU_SRI in the NV_PCK of the current VOBU is referenced to determine whether the VOBU to be scanned contains a video data. That is, if V_BWD_Exist1 of VWDIn of VOBU_SRI is 1, the VOBU contains a video data. If the VOBU to be scanned contains a video data, control is passed to step S410. If no video data exists, control is passed to step S411.

In step S410, as the address SA of the next VOBU from which a data is to be fetched, the current VOBU address NV_PCK_LBN deleted by BWDA (BWDIn) is set. That is, a VOBU at a distance corresponding to the scan interval n is set.

Thus, in step S410, as the SA, a VOBU found temporally at the scan interval n is set, which enables to reproduce VOBU at the scan interval n during the BWD-scan.

On the other hand, in step S411, the value n is substituted for m so as to temporarily save the value n.

In step S412, it is determined whether the address of the VOBU to be scanned is identical to the VOBU address immediately before the current VOBU. That is, it is determined whether the address of the VOBU to be scanned is identical to the address of the BWDIPrev indicated in VOBU_SRI. If the address of the VOBU to be scanned is identical to the address of the VOBU immediately before the current VOBU, control is passed to step S415. Otherwise, control is passed to step S413.

In step S413, the V_BWD_Exist2 to be scanned is referenced according to the VOBU_SRI, and it is determined whether a video data exists between the VOBU to be scanned and the VOBU one step later on the VOBU_SRI of that VOBU to be scanned. That is, if the V_BWD_Exist2 of VWDIn of VOBU_SRI is 1, there exists a VOBU containing a video data. If a video data exists between the VOBU to be scanned and the VOBU one step later than that VOBU on the SRI, control is passed to step S416. Otherwise, control is passed to step S414.

In step S414, the value n is deleted by 1 to repeat the processing of step S412 and after. That is, in the loop processing of steps S412 to S414, it is determined whether a video data exists between the VOBU to be scanned and the current VOBU.

In the loop processing of steps S412 to S414, n is decremented for each one step and if no video data is found, then BWDA (BWDI (n))–BWDA (BWDIPrev) and control is passed from step S412 to step S415 where the temporarily saved n is fetched so as to set the SA.

Here, in step S415, BWDIVideo is referenced to fetch the address immediately before a video gap start, so that the SA is the address immediately before the video gap start. Moreover, the Gap is set to 1. As the BSA, the NV-PCK-LBN subtracted by BWDA (BWDI (m)) is set. The values set in this step S415 are used in the aforementioned step S402.

Moreover, in the loop of steps S412 to S414, n is decremented for each one step and if a video data is found, then V_BWD_Exist2 (BWDI (n))=1 and control is passed from step S413 to step S416 where n is subtracted by 1. Control is passed to step S417 where the SA is set. It should be noted that because the n is fluctuates, the scan interval n is reset to the initial scan interval n in step S401.

In step S417, as the address SA of the next VOBU from which a data is to be fetched, the current VOBU address NV_PCK_LBN subtracted by BWDA (BWDIn) is set. That is, the VOBU at a distance according to the scan interval n is set.

Thus, when a video data exists, i.e., when a video data terminates, a video data immediately after the termination of the video gap is fetched. It should be noted that if a VOBU exists between steps in VOBU_SRI and the video data is disconnected in that VOBU, the address of the VOBU immediately before that VOBU having the video data disconnection is set as the SA in the processing loop of the next step S401.

The controller 11 carries out the aforementioned steps S401 to S417 to set the SA, i.e., the address of the VOBU from which a data is to be fetched, and then starts the processing of steps S501 and after shown in FIG. 18.

In step S501, the controller 11 makes the data decoder 4 read in a data of the VOBU at the specified address, and in step S501, fetches the NV_PCK of the VOBU of the specified address.

When the NV_PCK is fetched, in step S503 it is determined whether the Gap is 1. If the Gap is 1, control is passed to step S504. Otherwise, control is passed to step S506.

In step S504, the demultiplexer 5 is supplied with a data up to VOBU_SE_E_PTM of this VOBU, so that the video decoder 6 can output a video data up to a data immediately before the main video data disconnection.

Thus, if the main video data is disconnected in this step S504, this main video data up to the end is supplied to the demultiplexer 5. Consequently, when a so-called video gap is caused, it is possible to carry out the BWD-scan by displaying a video data immediately before the video gap.

In step S505, it is reported that this VOBU is the gap starting VOBU.

On the other hand, in step S506, it is determined how many I-pictures or P-pictures are contained in the VOBU which has been read in. This determination is made by detecting the information indicated in VOBU_1STREF_EA, VOBU_2NDREF_EA, and VOBU_3RDREF_EA in the same way as has been described in step S203.

If the VOBU contains no I-pictures or P-pictures, control is passed to step S507. If at least one I-picture or P-picture exists, control is passed to step S508.

In step S507, assuming that the VOBU does not contain any main video data, only the data of NV_PCK is supplied to the demultiplexer 5. That is, if no main video data exists, the video decoder 6 need not carry out decoding of a video data. Consequently, the other data is discarded in advance and only the necessary management data is supplied. It should be noted that if an audio data which is not the main video data exists, this audio data can also be supplied together with the NV-PCK to the demultiplexer 5.

Thus, a data not required in this step S507 is not supplied to the video decoder 6. This enables the video decoder 6 to carry out a decoding with a high efficiency at a high speed.

In step S508, one to three I-pictures or P-pictures of the VOBU are supplied to the demultiplexer 5. That is, if in step S506 it is determined that the VOBU contains only one I-picture, the data of the one I-picture is supplied to the demultiplexer 5, discarding the other data. If in step S506 it is determined that the VOBU contains only two I-pictures or P-pictures, the data of the two I-pictures or the P-pictures is supplied to the demultiplexer 5, discarding the other data. Moreover, if in step S506 it is determined that the VOBU contains three or more than three I-pictures or P-pictures, the data of the first I-pictures or P-pictures in the VOBU is supplied to the demultiplexer 5, discarding the other data Because only the data of up to three I-pictures and P-pictures required for the BWD-scan is supplied to the demultiplexer 5, the video decoder 6 can effectively carry out the decoding.

After the demultiplexer 5 is supplied with a data in steps S505. S507, and S508, the aforementioned steps S401 and after of FIG. 14 are repeated to fetch the data of the next VOBU.

Figure 19:
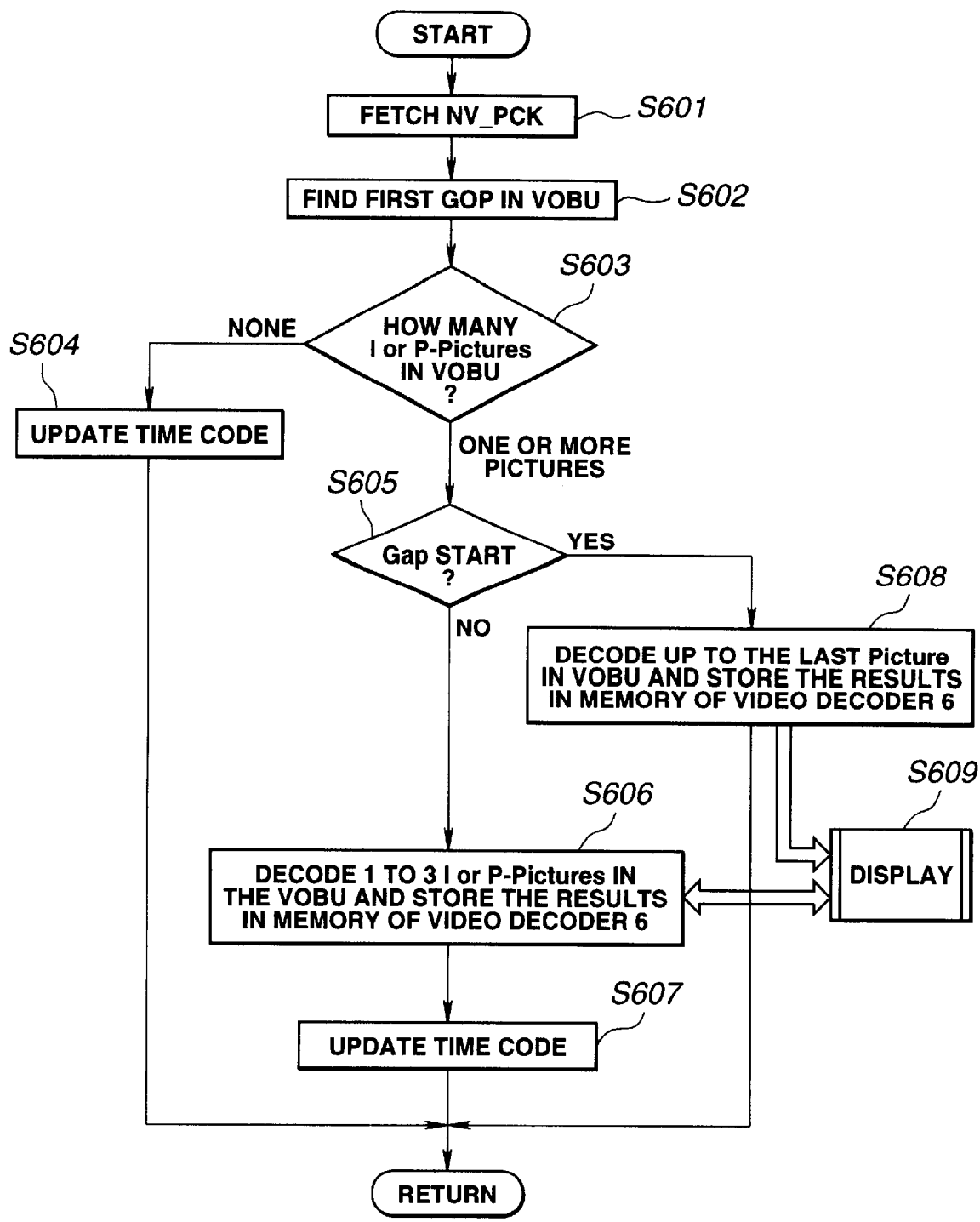
FIG. 19 is a flowchart showing the BWD-Scan processing by the DVD reproduction apparatus according to the present invention.

Next, description will be directed to control of the decoding in the video decoder 6 during a BWD-scan with reference to the flowchart of FIG. 19.

The controller 11 starts the processing of steps S601 and after when the a VOBU is supplied from the demultiplexer 5 to the video decoder 6.

In step S601, NV_PCK of the VOBU supplied to the video decoder 6 is fetched. When the NV_PCK is fetched, control is passed to step S602.

In step S602, the first GOP within the VOBU is sought. This processing is identical to that of the aforementioned step S304. When the first GOP of the VOBU is found, control is passed to step S603.

In step S6032, it is determined how many I-pictures or P-pictures are contained in this VOBU. The processing of this step S603 is identical to that of the aforementioned step S203 in the data decoder 4. If the VOBU contains no I-pictures or P-pictures, control is passed to step S604. If at least one I-picture or P-picture exists, control is passed to step S605, In step S604, C_ELTM of the NV_PCK is detected and the time code is updated. In this step S604, no decoding of a new video data is carried out but the video data which has been outputted in the temporally preceding processing is outputted (or displayed) from this video decoder 6, resulting in a still image. That is, in a state of the so-called video gap when no video data exists, only the time information is updated while the video data immediately before the video data disconnection is outputted.

When the time code is updated in step S604, the processing of step S601 and after is repeated to fetch the NV_PCK of the next VOBU.

On the other hand, in step S605, VOBU_SE_E_PTM of the NV_PCK is fetched and it is determined whether the video data is disconnected in this VOBU. That is, it is determined whether a video gap starts in this VOBU. If it is determined that the main video data is disconnected according to the VOBU_SE_E_PTM, control is passed to step S608. Otherwise, control is passed to step S606.

In step S606, the one to three I-pictures and P-pictures fetched in step S603 are decoded and stored in the memory of the video decoder 6.

Moreover, the video decoder 6, in step S609, decodes the data of three pictures in the memory and outputs a video data for display. For this, the output processing is carried out in parallel to the decoding processing and the pictures which have been decoded are successively outputted. It should be noted that this output processing (display processing) will be detailed later.

After the time code is updated in step S607, the processing of steps S601 and after is repeated to fetch a NV_PCK of the next VOBU.

On the other hand, in step S608, the main video data up to a picture immediately before the main video data disconnection is decoded, stored in the memory, and in step S609 outputted. Thus, the video data up to the picture immediately before the main video data disconnection is decoded. When a so-called video gap is caused, it is possible to carry out the BWD-scan by displaying the picture immediately before the video gap.

After the decoding is complete in step S608, the processing of steps S601 and after is repeated to fetch the NV-PCK of the next VOBU.

By carrying out the aforementioned processing, the DVD reproduction apparatus 100 can output the first three I-pictures and P-pictures in the VOBU during a FWD-scan and BWD-scan. Thus, it is possible to obtain a smooth display during a FWD-scan and BWD-scan.

Moreover, with any scan interval, for a cell change portion, the first VOBU in a cell and the last VOBU in a cell are reproduced, facilitating search when a scene is changed to another.

Moreover, when a so-called video gap is caused, i.e., a video data is disconnected, the picture immediately before the disconnection is outputted, which enables to carry out the FWD-scan processing and the BWD-scan processing while continuing a display similar to the normal reproduction output. Furthermore, during such a video gap, it is possible to carry out the FWD-scan the BWD-scan processing which only updates the time code.

Next, description will be directed to the display processing from the video decoder 6 carried out by the controller 11 of the DVD reproduction apparatus during the FWD-Scan and BWD-Scan. It should be noted that in the DVD reproduction apparatus 100, strictly speaking, a video data is outputted from the NTSC conversion circuit so as to display the video data but its display timing depends on the output timing from the video decoder 6. Here, the output of a video data from the video decoder 6 will be sometimes expressed as "displayed".

The video decoder 6 of the DVD reproduction apparatus 100, according to control of the controller 11, successively outputs in the temporal order the I-pictures and P-pictures which have been decoded on the memory during the FWD-scan and BWD-scan. Here, the video decoder 6 outputs only the first three I-pictures and P-pictures of the VOBU. The controller 11 detects the passing time of the VOBU containing the I-pictures and the like outputted from the video decoder 6 and averages the output intervals for displaying the video data.

Figure 20:
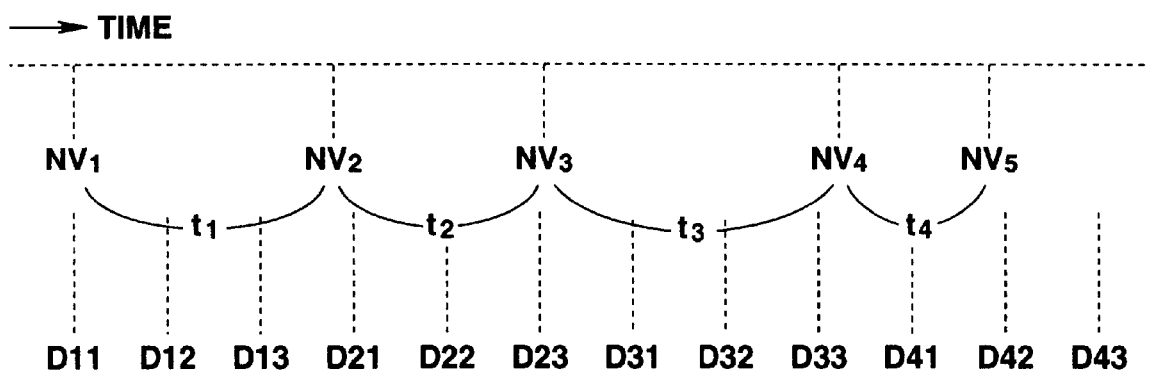
FIG. 20 explains a method of video data output during the FWD-Scan and the BWD-Scan by the DVD reproduction apparatus according to the present invention.

More specifically, as shown in FIG. 20, the passing time of NV-PCK to the demultiplexer 5 is detected to carry out averaging. If $t_1$ is assumed to be the difference between the passing time of the first NV_PCK ($NV_1$) and the passing time of the second NV_PCK ($NV_2$), then the display interval of the pictures ($D_{11}$, $D_{12}$, $D_{13}$) corresponding to the first NV_PCK is averaged to $t_1/3$. Moreover, if $t_2$ is the time difference between the passing time of the second NV_PVK ($NV_2$) and the passing time of the third NV_PCK ($NV_3$), the display interval of the pictures ($D_{21}$, $D_{22}$, $D_{23}$) corresponding to the second NV_PCK is averaged to $((t_1+t_2)/2)/3$. Moreover, if $t_3$ is the difference between the passing time of the third NV_PCK ($NV_3$) and the passing time of the fourth NV_PCK ($NV_4$), the display interval of the pictures ($D_{31}$, $D_{32}$, $D_{33}$) corresponding to the third NV_PCK is averaged to $((t_1+t_2+t_3)/3)/3$.

That is, pictures to be displayed are successively averaged so as to display the pictures according to the processing speed such as reproduction and decoding. It should be noted that the number of samples of the past VOBU to be averaged is set to a predetermined value so that old samples are successively discarded.

Figure 21:
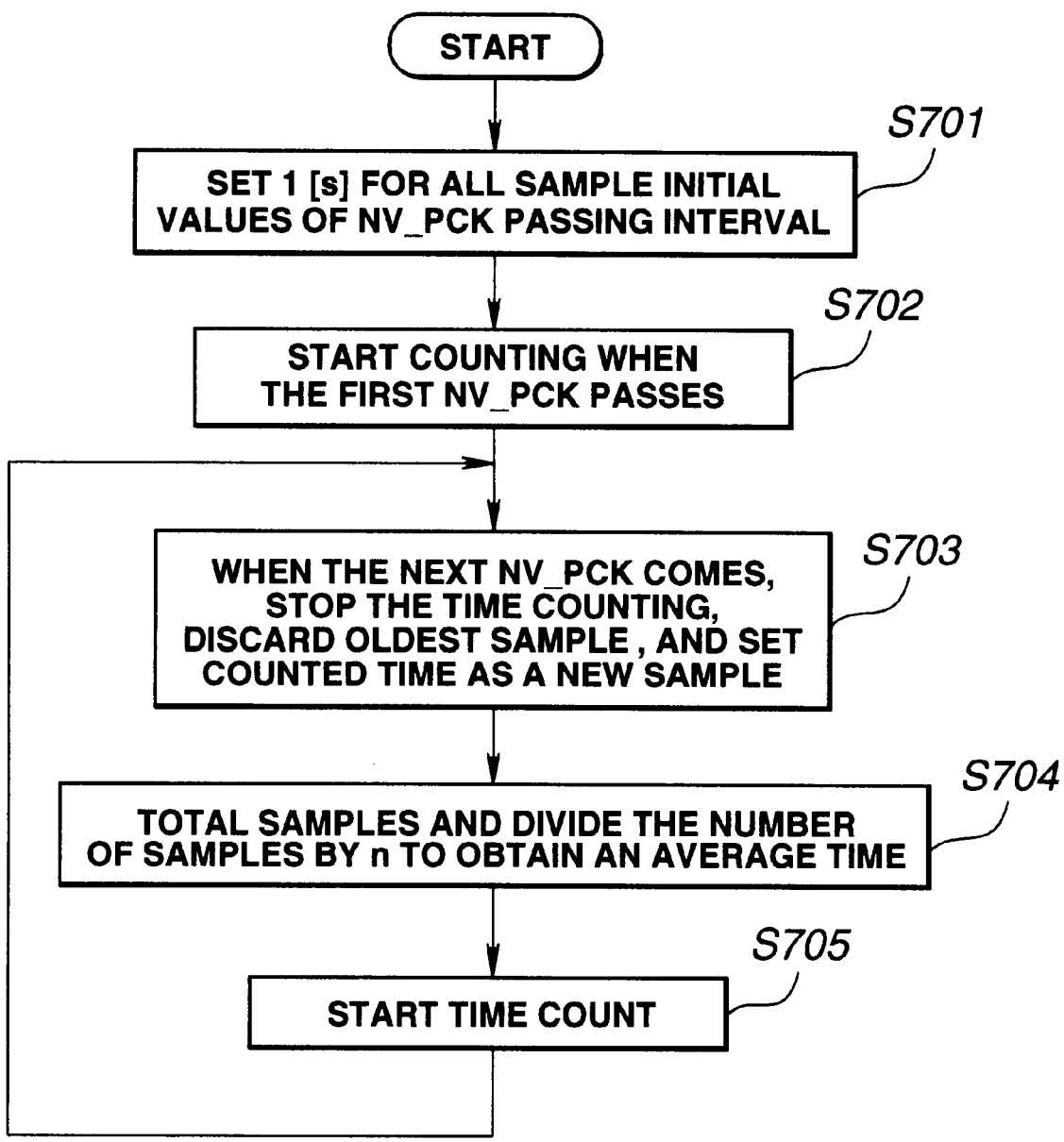
FIG. 21 is a flowchart showing a measurement processing to determine a time lapse of a VOBU passing through the demultiplexer of the DVD reproduction apparatus according to the present invention.

FIG. 21 is a flowchart showing the processing for counting the passing time of NV_PCK into the demultiplexer 5.

The controller 11 starts the processing of steps S701 and after when a FWD-scan or BWD-scan is specified by the user operation.

In step S701, samples of NV_PCK passing time are set to the initial values, i.e., 1 second.

After the samples are set to the initial value, control is passed to step S702 where a wait state continues until a first NV_PCK passes through the demultiplexer 5 and a time count is started when the first NV_PCK passes through the demultiplexer 5.

After the time count has started, in step S703 a wait state continues until next NV_PCK passes and the time count is halted when the next NV_PCK passes. The oldest sample is discarded and the time counted is set as the newest sample.

In step S704, the samples are totaled and the obtained sum is divided by the number of samples to obtain the average passing time of the VOBU through the demultiplexer 5.

When the average time is obtained, in step S705 the time count is resumed to repeat the processing of step S703 and after.

Figure 22:
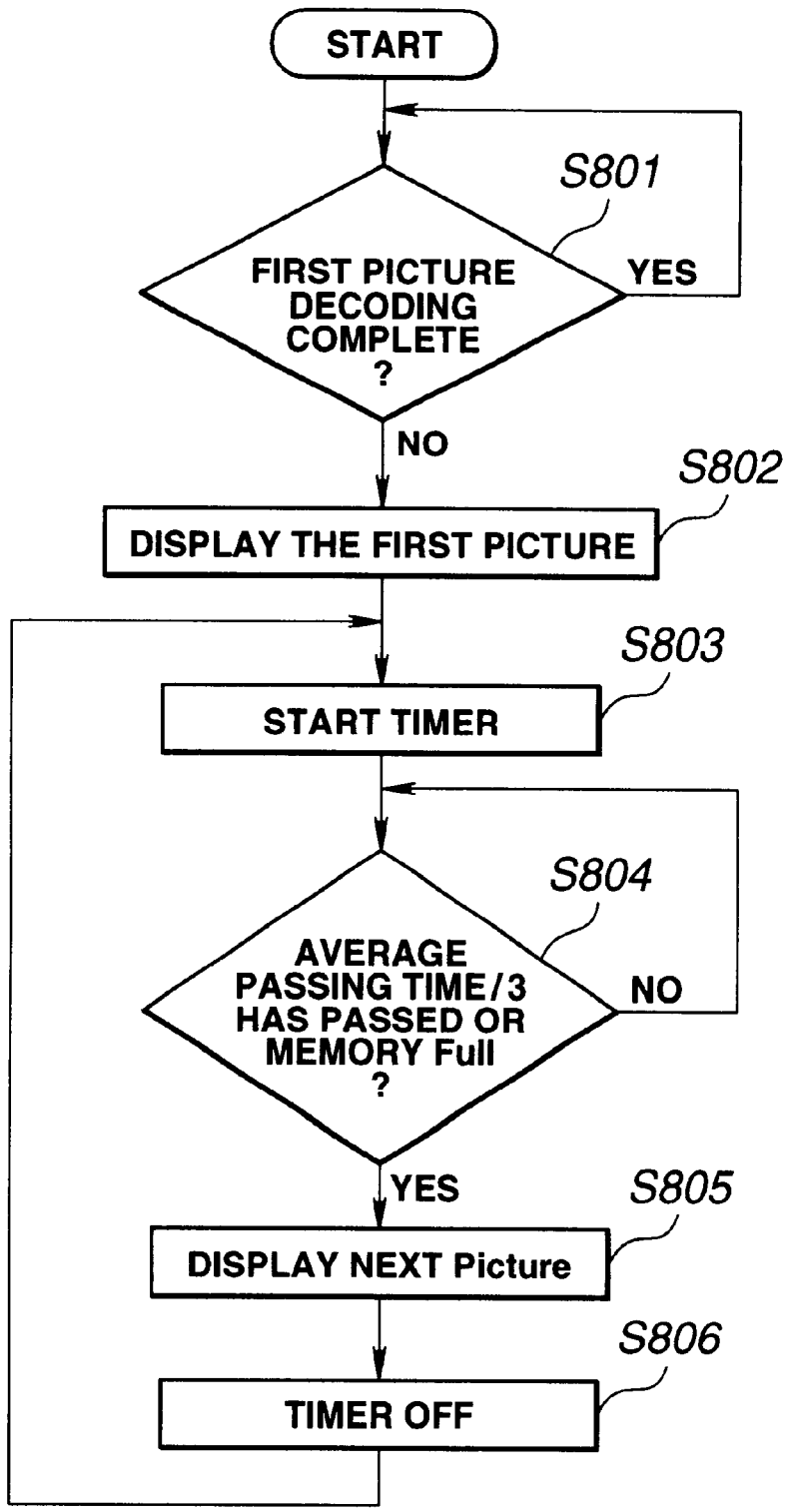
FIG. 22 is a flowchart explaining the video data output during the FWD-Scan and the BWD-Scan by the DVD reproduction apparatus according to the present invention.

FIG. 22 is a flowchart showing the display processing of the I-pictures and P-pictures which have been decoded on the memory of the video decoder 6 during the FWD-scan and the BWD-scan. This display processing is controlled by the controller 11.

The controller 11 starts the processing of step S801 when the user operation such as FWD-scan or BWD scan is entered.

In step S801, it is determined whether the video decoder 6 has decoded the first I-picture or P-picture, and a wait state continues until the first one I-picture or P-picture has been decoded by the video decoder 6. It should be noted that this first one picture is, if in the FWD-scan, the first I-picture at the head of the stream in the VOBU, and if in the BWD-scan, the last picture on the stream among the three I-pictures or P-pictures. This is because in the case of BWD-scan, pictures in the VOBU are reproduced in the opposite direction to the time axis.

When the first one picture is decoded, in step S802 the first one picture decoded is displayed and control is passed to step S803.

In step S803, the timer provided in the controller 11 is started. After the timer is started, in step S804 the following are determined: whether the average passing time/3 obtained by the processing of steps S701 to S705 of FIG. 21 has elapsed; whether the memory of the video decoder 6 still has an area for carrying out decoding; and whether the memory of the video decoder 6 still has pictures which have been decoded.

If the average passing time/3 has passed and the memory of the video decoder 6 has a picture which has been decoded, or if the memory of the video decoder 6 has no area for advancing the decoding, control is passed to step S805. Otherwise, a wait state continues in this step S804.

In step S805, a processing for displaying the next picture is carried out. Note that the processing of this step S805 differs between the FWD-scan and BWD-scan. In the case of FWD-scan, the pictures are displayed in the order of decoding in the forward direction of the time axis. In the case of BWD-scan, the pictures are displayed in the opposite order of the decoding so as to reproduce in the backward direction of the time axis. When the next picture is displayed, control is passed to step S806.

In step S806, the timer is reset so as to repeat the processing of steps S803 and after.

As has thus far been described, in this DVD reproduction apparatus 100, during a FWD-scan and BWD-scan, by averaging the display intervals of pictures reproduced, it is possible to output a smooth display picture, enabling an easy search by the user.

What is claimed is:

1. A video data decoding apparatus comprising:

decoding means supplied with video data which has been compressed by utilizing a time correlation over a plurality of frames and which is supplied in units comprising video data of a plurality of frames, for spreading said compressed video data to create video data which is outputted from said decoding means; and control means supplied with unit management information, contained within said units, containing unit search information indicating time information between units, for controlling the units supplied to said decoding means according to said unit search information, wherein said control means intermittently supplies the units to said decoding means and counts intermittence intervals between said intermittently supplied units to obtain an average time of said intermittence intervals, and said decoding means spreads data of the first n I-pictures (Intra Coded Picture) or P-pictures (Predictive Coded Picture) of each intermittently supplied unit, n being an integer, so as to generate spread video data of said n I- or P-pictures and output the spread video data of said n I-pictures or P-pictures frame by frame at an interval of said average time multiplied by 1/n.

2. A video data decoding apparatus as claimed in claim 1, wherein said compressed video data supplied to said decoding means is video data reproduced from a DVD disc.

3. A video data decoding method comprising:
supplying video data which has been compressed by utilizing a time correlation over a plurality of frames, in units that each comprise video data of a plurality of frames;
intermittently selecting the units supplied according to unit search information indicating time information between units from unit management information contained in said units;
counting intermittence intervals of said supplied units so as to obtain an average time of said intermittence intervals;
creating video data by spreading the first n I-pictures (Intra Coded Picture) or P-pictures (Predictive Coded Picture) within said units intermittently selected, n being an integer; and
outputting video data of said n I-pictures or P-pictures which have been spread, on a frame by frame basis, at an interval of said average time multiplied by 1/n.

4. A video data decoding method as claimed in claim 3, wherein said compressed video data supplied is video data reproduced from a DVD disc.

5. A video signal reproduction apparatus for reproducing video data which has been compressed by utilizing a time correlation over a plurality of frames, said apparatus comprising:
decoding means supplied with said video data in units each comprising video data of a plurality of frames, for spreading said compressed video data to create video data which is outputted from said decoding means; and
control means supplied with unit management information, contained within said units, containing unit search information indicating time information between units, for controlling the units supplied to said decoding means according to said unit search information,
wherein said control means intermittently supplies the units to said decoding means and counts intermittence intervals between said intermittently supplied units to obtain an average time of said intermittence intervals, and said decoding means spreads data of the first n I-pictures (Intra Coded Picture) or P-pictures (Predictive Coded Picture) of each intermittently supplied unit, n being an integer so as to generate spread video data of said n I- or P-pictures and output the spread video data of said n I-pictures or P-pictures frame by frame at an interval of said average time multiplied by 1/n.

6. A video signal reproduction apparatus as claimed in claim 5, wherein said compressed video data supplied to said decoding means is video data reproduced from a DVD disc.

7. A video signal reproduction method for reproducing video data which has been compressed by utilizing a time correlation over a plurality of frames, said method comprising:
supplying said video data in units each comprising video data of a plurality of frames;
intermittently selecting the units supplied according to unit search information indicating time information between units from unit management information contained in said units;
counting intermittence intervals of said supplied units to obtain an average time of the intermittence intervals;
creating video data by spreading the first n I-pictures (Intra Coded Picture) or P-pictures (Predictive Coded Picture) within said units intermittently selected, n being an integer; and
outputting video data of said n I-pictures or P-pictures which have been spread, on a frame by frame basis, at an interval of said average time multiplied by 1/n.

8. A video signal reproduction method as claimed in claim 7, wherein said compressed video data supplied is video data reproduced from a DVD disc.

9. A video data decoding apparatus as claimed in claim 1, wherein said n I- or P-pictures comprise at least one I-picture and at least one P-picture.

10. A video signal reproduction method as claimed in claim 7, wherein said n I- or P-pictures comprise at least one I-picture and at least one P-picture.

11. A video data decoding apparatus as claimed in claim 1, wherein said control means obtains said average time by counting intermittence intervals of only the most recent k video data units, where k is a predetermined integer.

12. A video data decoding apparatus as claimed in claim 1, wherein said average time is a cumulative average time that is determined differently for individual ones of said units, with first, second and $j^{th}$ cumulative average times being determined for first, second and $j^{th}$ units, respectively, of said supplied video data units, where j is an integer;
said first cumulative average time is a time $t_1$ between a first frame of said first unit and a first frame of said second unit, wherein decoded frames of said first unit are output at said first cumulative average time multiplied by 1/n;
said second cumulative average time is determined as $(t_1+t_2)/2$, where $t_2$ is the time between the first frame of said second unit and a first frame of a third of said units, wherein decoded frames of said second unit are output at said second cumulative average time multiplied by 1/n; and
said $j^{th}$ cumulative average time is computed as $(t_1+t_2+ \ldots t_j)/j$, where $t_j$ is the time between the first frame of said $j^{th}$ unit and the first frame of the $(j+1)^{st}$ unit of said supplied units, wherein decoded frames of said $j^{th}$ unit are output at said $j^{th}$ cumulative average time multiplied by 1/n.

13. A video data decoding method apparatus as claimed in claim 3, wherein said average time is obtained by counting intermittence intervals of only the most recent k units of video data, where k is a predetermined integer.

14. A video data decoding method as claimed in claim 3, wherein said average time is a cumulative average time that is determined differently for individual ones of said units, with first, second and $j^{th}$ cumulative average times being determined for first, second and $j^{th}$ units, respectively, of said supplied video data units, where j is an integer;
said first cumulative average time is a time $t_1$ between a first frame of said first unit and a first frame of said second unit, wherein decoded frames of said first unit are output at said first cumulative average time multiplied by 1/n;
said second cumulative average time is determined as $(t_1+t_2)/2$, where $t_2$ is the time between the first frame of said second unit and a first frame of a third of said units, wherein decoded frames of said second unit are output at said second cumulative average time multiplied by 1/n; and
said $j^{th}$ cumulative average time is computed as $(t_1+t_2+ \ldots +t_j)/j$, where $t_j$ is the time between the first frame of said $j^{th}$ unit and the first frame of the $(j+1)^{st}$ unit of said supplied units, wherein decoded frames of said $j^{th}$ unit are output at said $j^{th}$ cumulative average time multiplied by 1/n.

15. A video signal reproduction apparatus as claimed in claim 5, wherein said control means obtains said average time by counting intermittence intervals of only the most recent k units of video data, where k is a predetermined integer.

16. A video signal reproduction apparatus as claimed in claim 5, wherein said average time is a cumulative average time that is determined differently for individual ones of said units, with first, second and $j^{th}$ cumulative average times being determined for first, second and $j^{th}$ units, respectively, of said supplied video data units, where j is an integer;

said first cumulative average time is a time $t_1$ between a first frame of said first unit and a first frame of said second unit, wherein decoded frames of said first unit are output at said first cumulative average time multiplied by 1/n;

said second cumulative average time is determined as $(t_1+t_2)/2$, where $t_2$ is the time between the first frame of said second unit and a first frame of a third of said units, wherein decoded frames of said second unit are output at said second cumulative average time multiplied by 1/n; and said $j^{th}$ cumulative average time is computed as $(t_1+t_2+\ldots +t_j)/j$, where $t_j$ is the time between the first frame of said $j^{th}$ unit and the first frame of the $(j+1)^{st}$ unit of said supplied units, wherein decoded frames of said $j^{th}$ unit are output at said $j^{th}$ cumulative average time multiplied by 1/n.

17. A video signal reproduction method as claimed in claim 7, wherein said average time is obtained by counting intermittence intervals of only the most recent k units of video data, where k is a predetermined integer.

18. A video signal reproduction method as claimed in claim 7, wherein said average time is a cumulative average time that is determined differently for individual ones of said units, with first, second and $j^{th}$ cumulative average times being determined for first, second and $j^{th}$ units, respectively, of said supplied video data units, where j is an integer;

said first cumulative average time is a time $t_1$ between a first frame of said first unit and a first frame of said second unit, wherein decoded frames of said first unit are output at said first cumulative average time multiplied by 1/n;

said second cumulative average time is determined as $(t_1+t_2)/2$, where $t_2$ is the time between the first frame of said second unit and a first frame of a third of said units, wherein decoded frames of said second unit are output at said second cumulative average time multiplied by 1/n; and said $j^{th}$ cumulative average time is computed as $(t_1+t_2+\ldots +t_j)/j$, where $t_j$ is the time between the first frame of said $j^{th}$ unit and the first frame of the $(j+1)^{st}$ unit of said supplied units, wherein decoded frames of said $j^{th}$ unit are output at said $j^{th}$ cumulative average time multiplied by 1/n.

\* \* \* \* \*